(12) United States Patent
Sakamoto et al.

(10) Patent No.: US 7,518,998 B2
(45) Date of Patent: *Apr. 14, 2009

(54) IP PACKET COMMUNICATION APPARATUS

(75) Inventors: Kenichi Sakamoto, Tokyo (JP); Noboru Endo, Kodaira (JP); Toshiki Sugawara, Koganei (JP); Koji Wakayama, Kokubunji (JP); Kazuyoshi Hoshino, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 635 days.

This patent is subject to a terminal disclaimer.

(21) Appl. No.: 11/115,125

(22) Filed: Apr. 27, 2005

(65) Prior Publication Data

US 2005/0185577 A1 Aug. 25, 2005

Related U.S. Application Data

(63) Continuation of application No. 09/259,051, filed on Mar. 1, 1999, now Pat. No. 6,907,006.

(30) Foreign Application Priority Data

Sep. 11, 1998 (JP) ................................. 10-257823

(51) Int. Cl.
*H04L 12/24* (2006.01)
*H04L 12/26* (2006.01)
*H04L 1/22* (2006.01)

(52) U.S. Cl. ................................. 370/236.2; 370/241.1

(58) Field of Classification Search ............... 370/236.2, 370/241.1
See application file for complete search history.

(56) References Cited

U.S. PATENT DOCUMENTS

| 4,161,719 A | 7/1979 | Parikh et al. |
|---|---|---|
| 4,561,090 A | 12/1985 | Turner |
| 4,884,263 A | 11/1989 | Suzuki |
| 4,905,233 A | 2/1990 | Cain et al. |
| 4,964,112 A | 10/1990 | Appelmann |
| 5,016,243 A | 5/1991 | Fite, Jr. |
| 5,239,537 A | 8/1993 | Sakauchi |
| 5,274,680 A | 12/1993 | Sorton et al. |

(Continued)

FOREIGN PATENT DOCUMENTS

JP 9 149046 6/1997

OTHER PUBLICATIONS

"Draft Recommendation G.872 (EX G.OTN) Architecture of Optical Transport Networks" ITU-Telecommunication Standardization Sector, Feb. 1998, pp. 1-8.

(Continued)

*Primary Examiner*—Melvin Marcelo
(74) *Attorney, Agent, or Firm*—Mattingly, Stanger, Malur & Brundidge, P.C.

(57) ABSTRACT

In an IP packet communication apparatus, an operation and maintenance function capable of monitoring a transmission path is provided to a layer used to process a packet, which corresponds to an upper layer of an optical network. As one method for applying the operation and maintenance function to the packet layer, in the case of IP over PPP over WDM, an operation/maintenance frame is defined to a PPP frame so as to realize the operation/maintenance function of a PPP connection. In the case that a plurality of connections are multiplexed on the same transmission path, a maintenance frame is conducted in order to operate/manage these connections by being grouped, so that a fault occurring in the optical network is monitored. As another method for applying the operation and maintenance function to the packet layer, an operation/maintenance frame is defined to an IP packet so as to realize an operation and maintenance function of an IP flow. Also, since a plurality of flows are multiplexed on the same transmission path, a management packet is defined to operate/manage these flows to be grouped, so that a fault occurring the in the optical network is monitored.

18 Claims, 22 Drawing Sheets

U.S. PATENT DOCUMENTS

| | | | |
|---|---|---|---|
| 5,315,594 | A | 5/1994 | Noser |
| 5,461,609 | A | 10/1995 | Pepper |
| 5,488,501 | A | 1/1996 | Barnsley |
| 5,594,729 | A | 1/1997 | Kanakia et al. |
| 5,724,352 | A | 3/1998 | Cloonan et al. |
| 5,764,651 | A | 6/1998 | Bullock et al. |
| 5,793,976 | A | 8/1998 | Chen et al. |
| 5,859,846 | A | 1/1999 | Kim et al. |
| 5,905,781 | A | 5/1999 | McHale et al. |
| 5,956,681 | A | 9/1999 | Yamakita |
| 5,982,783 | A | 11/1999 | Frey et al. |
| 6,023,467 | A | 2/2000 | Abdelhamid et al. |
| 6,044,080 | A | 3/2000 | Antonov |
| 6,075,788 | A | 6/2000 | Vogel |
| 6,111,673 | A | 8/2000 | Chang et al. |
| 6,160,808 | A | 12/2000 | Maruya |
| 6,163,527 | A | 12/2000 | Ester et al. |
| 6,246,683 | B1 | 6/2001 | Connery et al. |
| 6,252,853 | B1 | 6/2001 | Ohno |
| 6,304,549 | B1 | 10/2001 | Srinivasan et al. |
| 6,317,236 | B1 | 11/2001 | Saunders |
| 6,353,619 | B1 | 3/2002 | Banas |
| 6,907,006 | B1 * | 6/2005 | Sakamoto et al. ........ 370/236.2 |

OTHER PUBLICATIONS

J. Anderson, et al. "ATM-Layer OAM Implementation Issues" IEEE Communications Magazine, Sep. 1991, pp. 79-81.

J. Wei et al. "Network Control Management of Reconfigurable WDM All-Optical Network", IEEE Network Operations Management Symposium US, New York, NY vol. Conf. 10, Feb. 15, 1998, pp. 880-889.

IETF RFC 791.

IETF RFC 1662.

ITU-Telecommunication Standardization Sector Recommendation G.872.

ITU-Telecommunication Sector Recommendation G.707.

* cited by examiner

PPP FRAME FORMAT (RFC1662)

PPP OAM FRAME FORMAT

IPv4 FRAME FORMAT

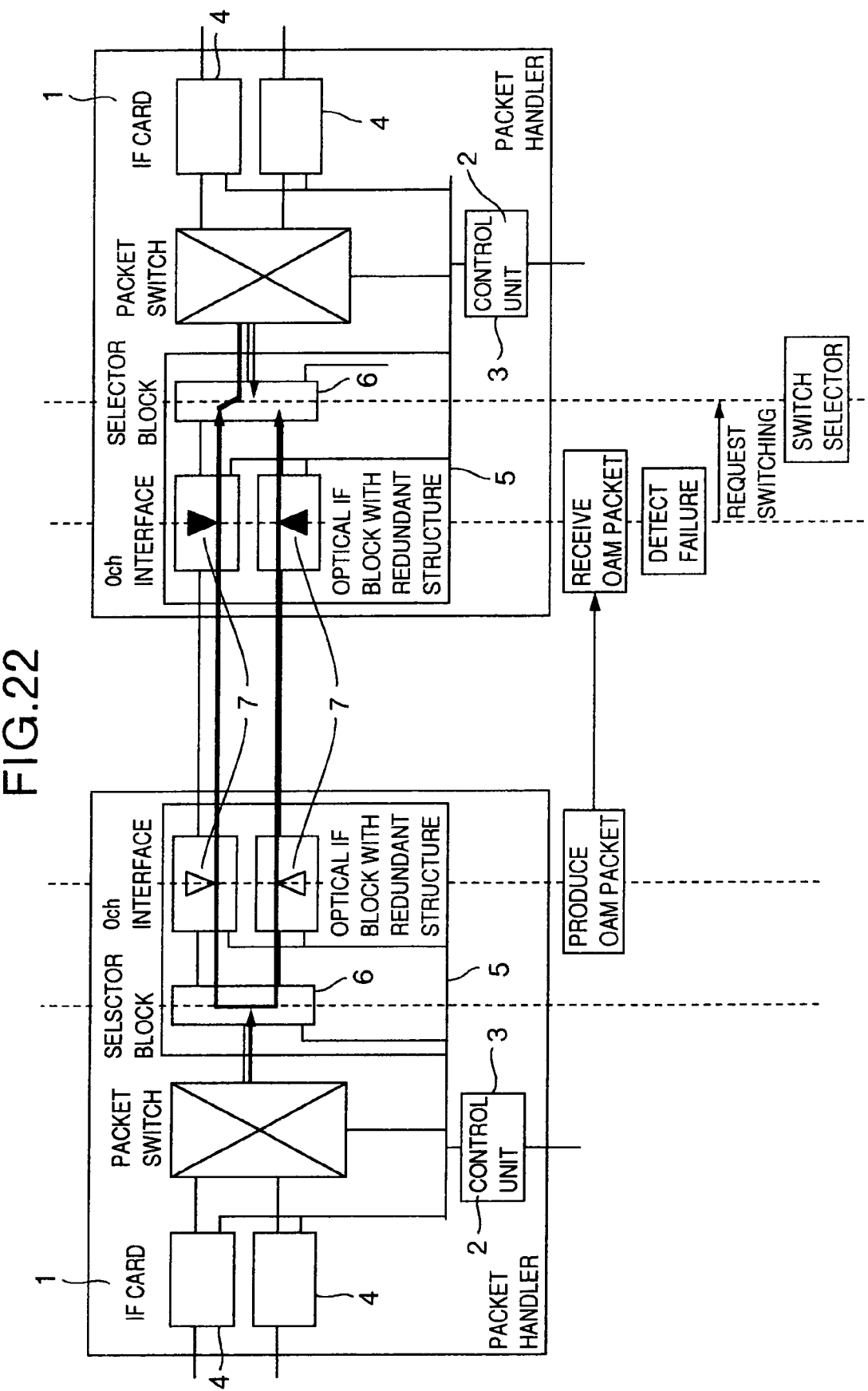

IP PACKET COMMUNICATION APPARATUS

The present application is a continuation of U.S. patent application Ser. No. 09/259,051, filed Mar. 1, 1999, now U.S. Pat. No. 6,907,006, which is incorporated by reference herein in its entirety.

BACKGROUND OF THE INVENTION

1. Field of the Invention

The present invention is related to a packet communication apparatus.

2. Description of the Related Art

In public communication networks and bank communication networks, since high reliability is required, various operation and maintenance requirements are satisfied. For instance, conditions of communication paths must be monitored, fault states must be immediately detected, and fault location must be avoided. The presently available public transmission networks have conducted the SDH (Synchronous Digital Hierarchy, or, known as "SONET" in the North America) system. This SDH system is normally defined by ITU-T recommendation G.707 (see International Telecommunication Union Telecommunication Standardization Sector). The SDH system may provide these OAM (Operation And Maintenance) functions (in particular, refer to 9.2.2 SOH bytes description of Recommendation G.707). In this SDH system, a header called a section overhead is applied to a frame on which user signals called VC (Virtual Container) are multiplexed, and then this frame is transmitted between the SDH systems. To this section overhead, the embedded type OAM functions are defined, for example, the BIP (Bit Interleave Parity) function capable of monitoring the error rate of the transmission path; the AIS/RDI notifying function capable of mapping the protocols used to switch the transmission path between the stations and also capable of notifying the malfunction of the transmission path and the fault in the transmission path; and the function capable of establishing the confirmation communication between the stations. The information acquired by the embedded type OAM function may be used to trigger the avoiding operation of the fault location, may be sent to the network management system capable of surveying the condition of the network so as to be used for executing the operation/maintenance of the network, and also may be used as the reply data to the claims made by the customers. Since the transmission network having the high reliability and the high maintenance characteristic is established by employing such an embedded type OAM function, this transmission network can satisfy the high reliability requirements of the public communication network and the bank communication network.

SUMMARY OF THE INVENTION

Very recently, computers are popularized and therefore, needs of data communications are increased. Accordingly, capacities of transmission paths required for IP networks are increased. Also, various services are provided on the Internet, so that reliability is also required for IP networks, although conventionally, the IP networks support a best effort traffic communication. In order to support the increased traffic, the optical network using the WDM (Wave Division Multiplexing) technique has been introduced. The architecture of the optical network is defined by, for example, ITU-T recommendation G.872 and G.873. When this optical network is employed, the cross-connection of the transfer path which has been conventionally carried out electrically in the SDH system can be carried out optically by employing the optical ADM technique. On the other hand, in packet communication networks, the needs of which are greatly extended, no synchronization is required in the telephone switching networks with using the conventional STM system. As a result, the necessities of introducing the SDH system generally used in the conventional public transmission network is reduced. Furthermore, when such an SDH system is introduced, the overhead such as the section overhead must be applied. Therefore, the amount of the user data which can be transferred through the same transmission path would be reduced. To avoid this difficulty, another transmission path has been proposed on the network concept called as IP over WDM, in which a data packet is directly mapped to an optical transmission path.

However, when the data packet is mapped to the optical transmission path without using the SDH frame in the transmission network, the operations such as an SES (severely erred second) and a protection function can be hardly carried out, which have been conventionally performed in the conventional SDH system, and are recognized as the services for the public networks. In the SDH system, the loss of frame synchronization of the transmission path can be detected by the framer (A1, A2) provided within the section overhead. Also, since the bit error of the transmission path can be detected by the BIP function (B1, B2), the performance degradation of the transmission path can be detected. To the contrary, in the optical network, the loss of signal (LOS) can be detected by measuring the reception level of the light. However, it is practically difficult to realize the fault monitoring function such as monitoring of performance degradation based on the bit error on the transmission path. As a consequence, if the performance degradation fault could not be detected, then the fault location avoiding operation based on this fault detection cannot be carried out.

On the other hand, in the IP over WDM network, the fast fault detecting function substantially equal to the SDH system is not defined in the IP layer corresponding to the upper layer of the optical network, and the adaptation layer, e.g. PPP (Point-To Point Protocol) used to carry the IP (Internet Protocol) packet on the optical network. In the IP layer, there is ICMP (Internet Control Message Protocol) defined in RFC (Request For Comment) 792. However, an object of this ICMP is to confirm reachability of a specific flow. This ICMP is not used to detect the fault in the transmission path. Also, in these layers, neither the fault detecting function of the transmission network, nor the restoration function is defined. As a consequence, these layers own the following technical problems. That is, IP over WDM network must provide the fault detecting function which is required in the public communication network, and the bank communication network. The IP over WDM network must provide such a function representative of the performance monitoring function. Concretely speaking, such a function capable of measuring/notifying SES, and a protection function capable of recovering from SES condition must be provided, which could not be realized by the SDH network.

Therefore, a first object of the present invention is capable of providing a maintenance function of a transmission path, especially a protection function and a function capable of measuring SES, even under the network in which an IP traffic is carried, and furthermore, an SDH protocol is not provided in a lower-grade layer. This maintenance function of the transmission can be operated even in the public network and the bank communication network.

A second object of the present invention is to provide a function capable of detecting a fault in a transmission path, and furthermore capable of restoring the fault within a short time period, even under the network in which an IP traffic is carried, and furthermore, an SDH protocol is not provided in a lower-grade layer.

To achieve the first object, an operation/maintenance function for monitoring a transmission path is introduced to a layer for processing a packet, corresponding to an upper layer of an optical network. As one method for applying the operation/maintenance function to the packet layer, the operation/maintenance function of the transmission path is arranged to the layer having a function for mapping an IP packet to the transmission path. Concretely speaking, in the case of the IP over WDM, the operation/maintenance frame is defined in the PPP frame, so that the operation/maintenance function of the PPP connection is realized. In the case that a plurality of connections are multiplexed on the same transmission path, the management frame for operating/managing these connections by grouping the connections is introduced so as to monitor the fault occurred in the optical network. As a grouping unit of connections, there are a method for collecting all connections multiplexed on a single wavelength, and another method for collecting a specific connection group. As an example of the specific connection group, there is a method for collecting such connections having the same performance of services QOS. In the case that the connections multiplexed on a single wavelength are collected and the OAM function is mounted, then this is equivalent to the fault detection of the transmission path. It should be noted that collecting of the connection groups having the same performance of services may be conceived by classifying these connection groups by, for example, IP addresses.

As another method for applying the operation/maintenance function to the packet layer, the operation/maintenance function is arranged in the IP layer. Concretely speaking, the operation/maintenance frame is defined in the IP packet so as to realize the operation/maintenance function of IP flow. Also, since a plurality of flows are multiplexed on the same transmission path, these flows are grouped to define the management packet for realizing the operation/maintenance of these flows, so that the fault of the optical network is monitored. Similar to the case that the OAM function is arranged in the adaptation layer, as a concrete grouping unit, there are a method for collecting all of these flows multiplexed on a single wavelength, and another method for collecting specific flow groups. As an example of the specific flow group, there is a method for collecting the flow groups having the same performance of services. In the case that the flows multiplexed on a single wavelength are collected, and the OAM function is mounted, if the section to be monitored is considered, then this is equivalent to the fault detection of the transmission path. Furthermore, since these embedded OAM functions are mounted, the fault conditions of the transmission path, for example SES, can be measured. Also, the information is acquired by the network management system, so that the condition of this network can be easily grasped.

To achieve the second object, the fault information of the transmission path, which is monitored by the packet layer, is notified to the optical layer. The switching operation of the optical layer is initiated, so that the fault occurred in the transmission path can be restored. The fault of the transmission path is found out by the means for achieving the first object, and this information is triggered so as to initiate the switching operation of the transmission path. The coordination used when the transmission path is switched (namely, exchange of information about switching both end transfer) may be carried out by employing the SV channel, or the OAM function of the packet layer similar to the fault detection.

Also, to initiate the switching operation of a partial section within the channel of the optical network, a function capable of electrically monitoring the packet layer is provided with an optical communication apparatus, so that the performance deterioration can be detected by the optical communication apparatus. To subdivide the fault, the control/monitoring channels corresponding to the respective redundant structural sections are set, so that the fault information of the channel until this apparatus is notified to the next apparatus. In this next apparatus, the fault notification given from the prestage is compared with the fault condition of the channel in this apparatus so as to judge as to whether or not the fault occurs between the prestage apparatus and the relevant apparatus. If the fault occurs between the prestage apparatus and the relevant apparatus, then the switching operation of the channel is initiated.

BRIEF DESCRIPTION OF THE DRAWINGS

For a more understanding of the present invention, reference is made of a detailed description to be read in conjunction with the accompanying drawings, in which:

FIG. 22 is an explanatory diagram for describing a sequence of switching faults occurred in a transmission path when a transmission performance is degraded, according to the present invention.

DETAILED DESCRIPTION OF THE PREFERRED EMBODIMENT

Referring now to drawings, an embodiment of the present invention will be described.

Figure 2:
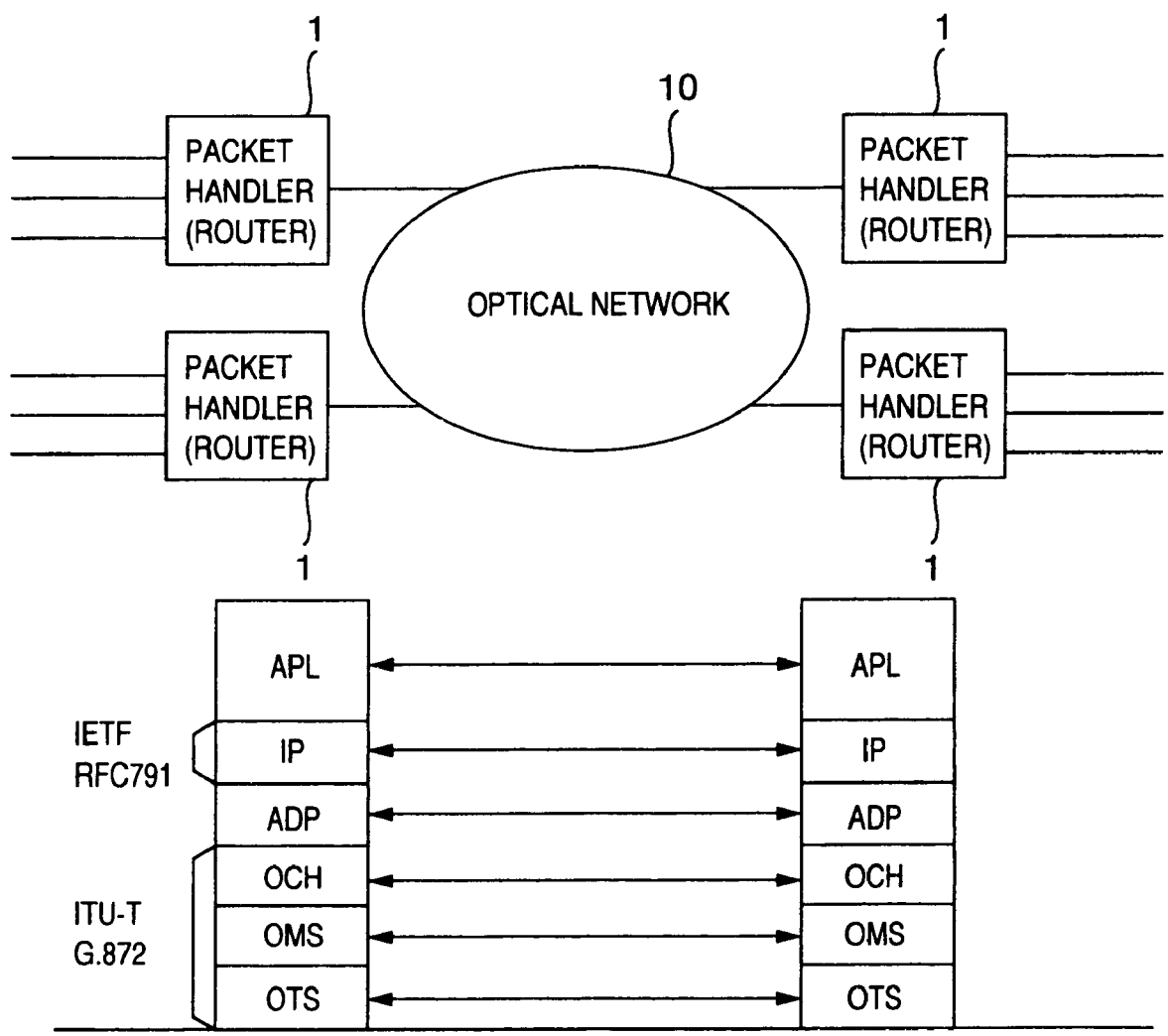
FIG. 2 schematically represents a structural example of a network, and a structural example of a protocol stock, according to an embodiment of the present invention.

FIG. 2 represents a network structure containing an optical network 10 to which a packet handler 1 according to the present invention, and a protocol stack to which the present invention is applied, according to an embodiment of the present invention. The packet handler is connected via an optical interface to an optical network.

A structure of the protocol stack is indicated. An IP (Internet Protocol) layer is defined by RFC 791 of IETF (Internet Engineering Task Force). Also, as to an optical network layer, for instance, the protocol stack defined by ITU-T G.872 is employed. An adaptation function involving such a function capable of identifying a head of a packet is required between a packet layer (concretely speaking, IP layer) and the optical network layer (concretely speaking, optical channel layer shown in the drawings). As the adaptation function, for example, PPP (Point-To-Point Protocol) defined by IETF RFC 1662 is employed.

First of all, as a typical example of the adaptation function, a fault detecting system of an optical channel in the case that a PPP layer is used will now be described with reference to FIG. 1, FIG. 3, FIG. 4, FIG. 5, FIG. 6, and FIG. 7.

Figure 1:
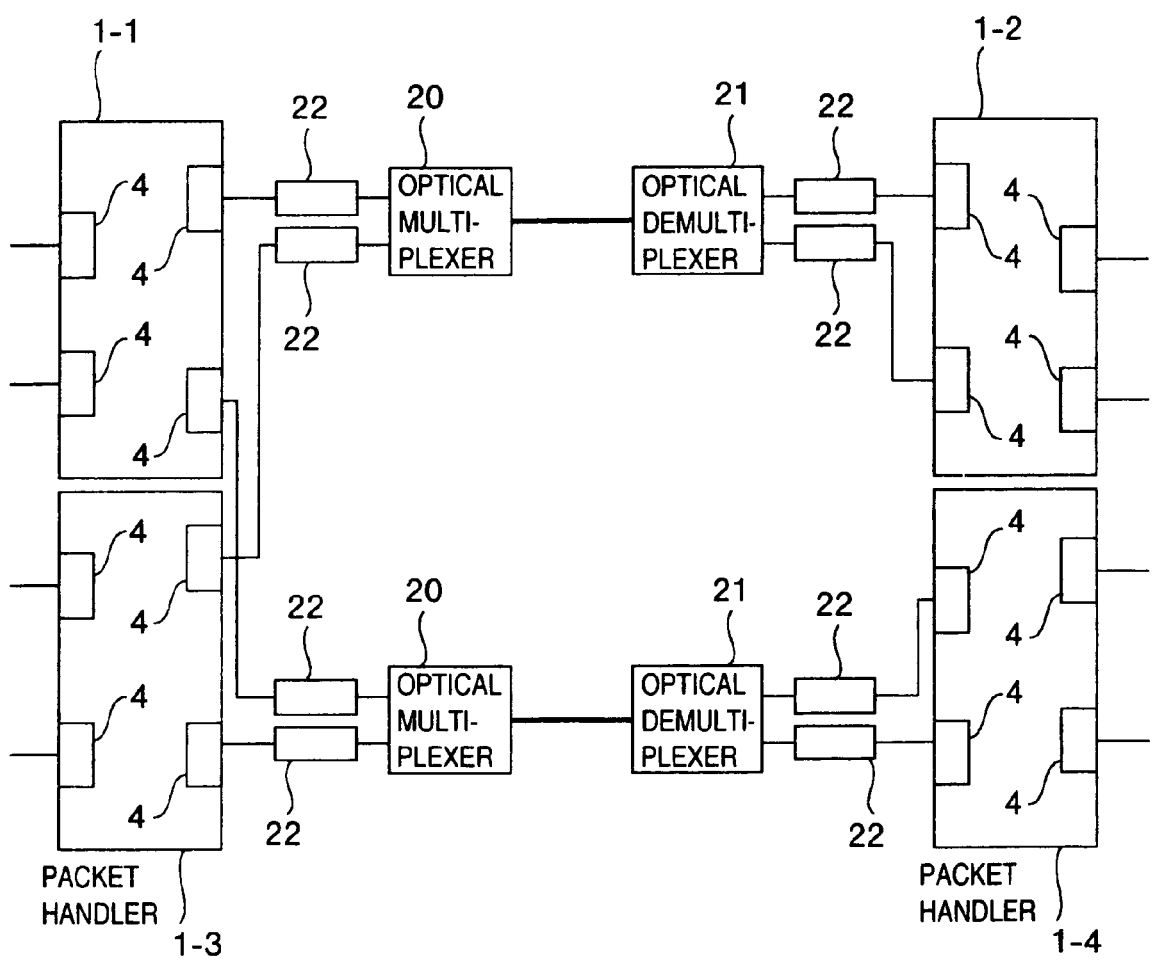
FIG. 1 schematically shows a structural example of a packet handler and an optical network, according to an embodiment of the present invention.

FIG. 1 shows such an embodiment of such a case that a packet handler 1 is connected via an optical channel adaptation block 22 to an optical network. The packet handler 1 is connected via a medium for transmitting either an electric signal or an optical signal to an optical channel adaptation block 22.

The packet handler 1-1 sends IP packets received at the input interface 4 to the destination output interface 4. The IP packets are sent from the output interface 4 to the optical adaptation block 22. The optical adaptation block 22 executes the adaptation of IP packets to the optical channel, and sends to the optical multiplexer 20. The optical multiplexer 20 transforms the optical channel to one of the wavelength to be multiplexed on wavelength division. The optical channels received from the optical adaptation blocks 22 are multiplexed on wavelength division and transmitted to the optical demultiplexer 21, which demultiplexes each optical channel from the received optical signal, and retransforms the wavelength to the one before the transformation on the optical adaptation block 22 of the transmitted side. The optical adaptation block 22 derives IP packets from the optical channel and sends the IP packets to the packet handler 1-2.

Figure 3:
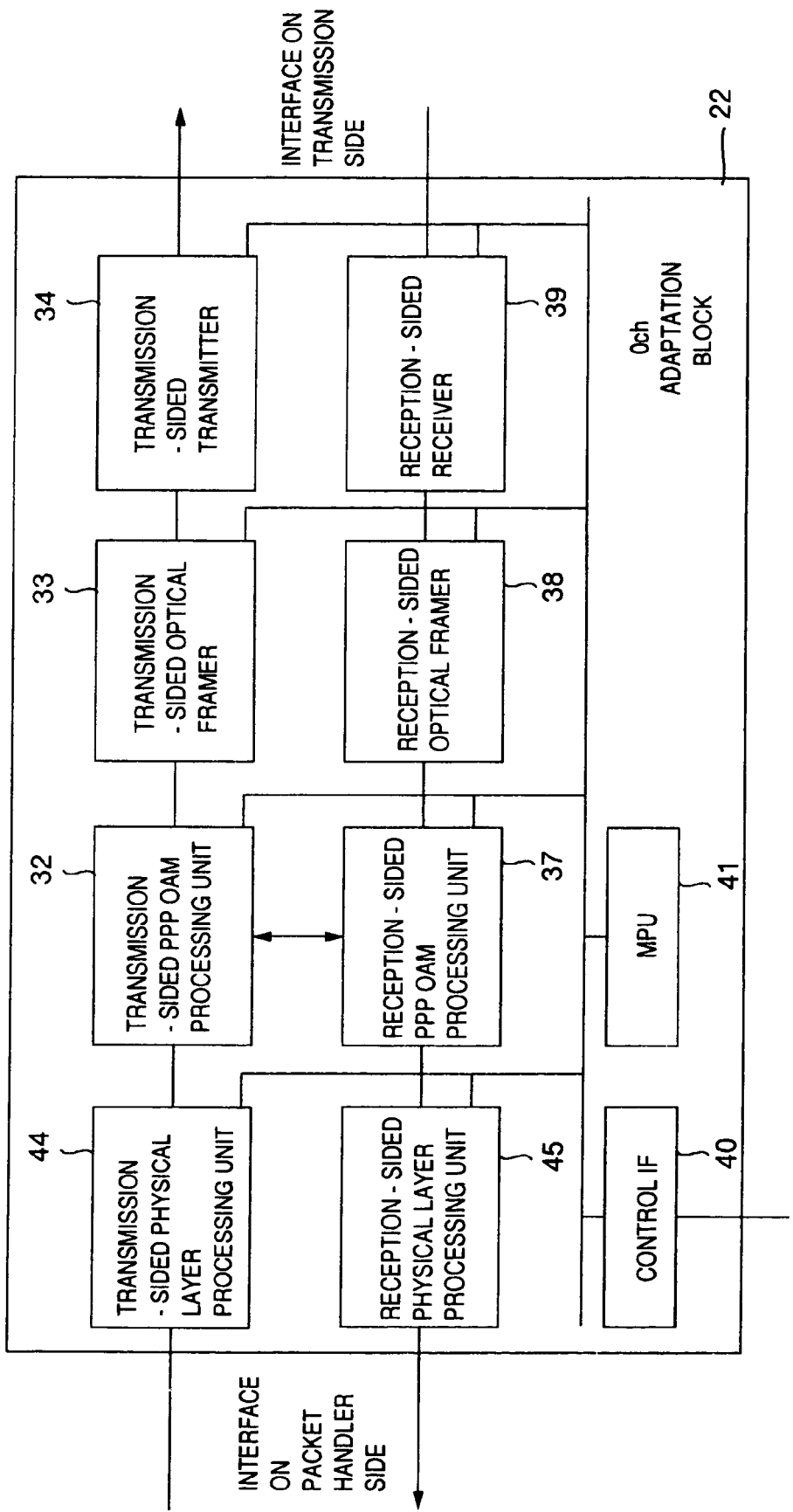
FIG. 3 is a schematic block diagram for indicating an optical channel adaptation block according to another embodiment of the present invention.

FIG. 3 is an embodiment of an optical channel adaptation block 22 according to the present invention. In this embodiment, an adaptation of a packet to an optical channel is carried out by way of a PPP protocol. A first explanation is made of a function on the side of a transmission. A physical layer is terminated by a physical layer processing unit 44 on the transmission side, and a PPP frame is derived. In a PPP OAM processing unit 32 on the transmission side, an OAM frame having a PPP frame structure is produced, and then this produced OAM frame having the PPP frame structure is multiplexed with another PPP frame (a detailed function will be explained with reference to FIG. 4) derived from a PPP processing unit 31 on the transmission side. In an optical framer 33 on the transmission side, a digital coding operation (for instance, NRZ method and the like) is carried out so as to send out a signal to an optical transmission path, and then, the digitally-coded signal is converted into an optical signal by an electro-optical conversion manner by a transmitter 34 on the transmission side. Thereafter, this converted optical signal is transmitted to the optical network. Next, a description is made of a function on the reception side. An opto-electric conversion is carried out for the received optical signal by a receiver 39 on the reception side. In an optical framer 38 on the reception side, a digital decoding operation is carried out from the electrically converted signal. Next, in a PPP OAM processing unit 37 on the reception side, cutting of a PPP frame, extracting of an OAM frame, monitoring, and an FCS (Frame Check Sequence) check are carried out so as to detect performance degradation of the transmission path (a detailed function will be described with reference to FIG. 4). In a physical layer processing unit 45 on the reception side, the PPP frame is mapped to the physical layer.

Figure 4:
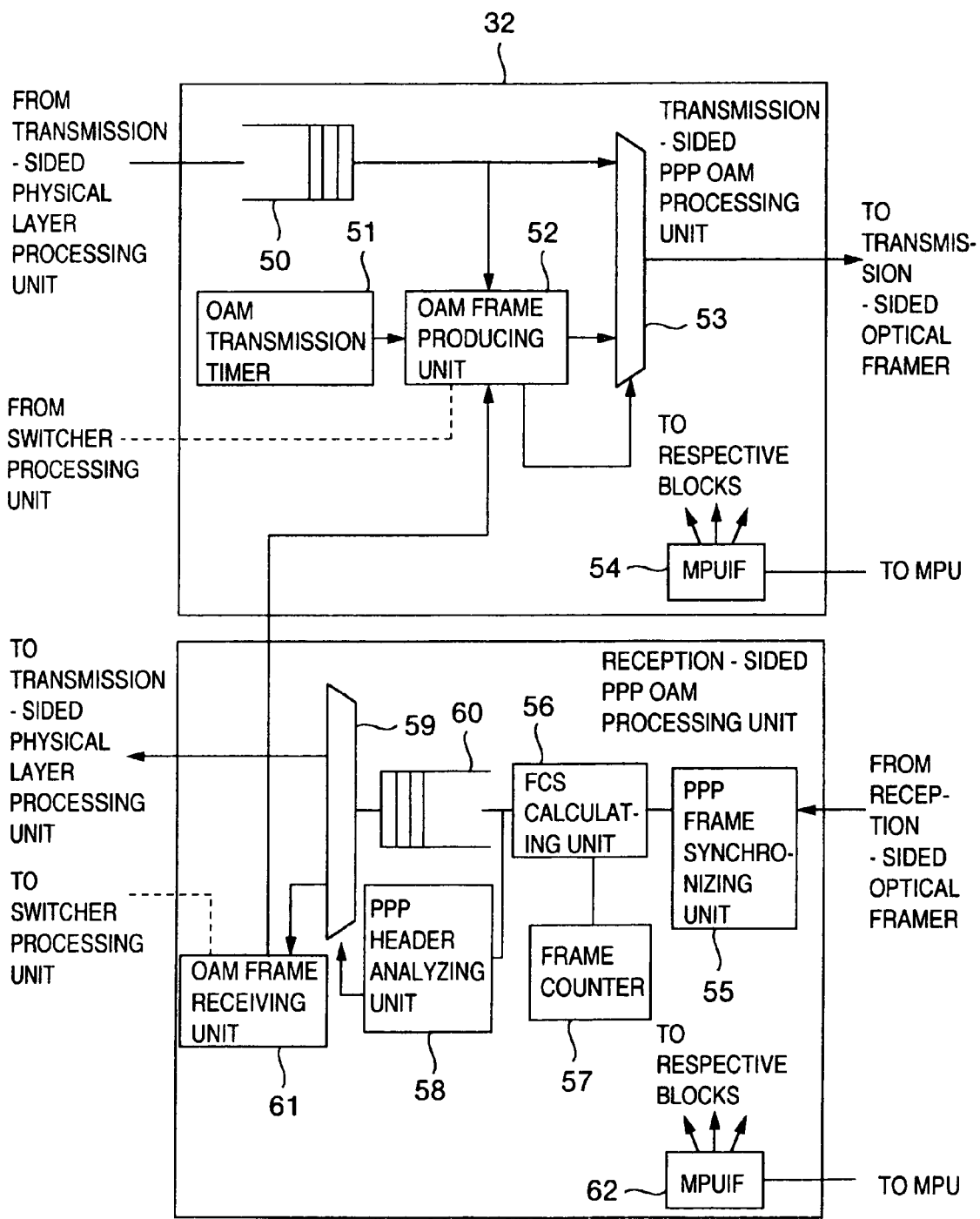
FIG. 4 is a schematic block diagram for representing an OAM function processing unit of a PPP layer of the packet handler according to the embodiment of the present invention.

FIG. 4 schematically shows an internal arrangement of the PPP OAM processing unit 32 provided on the transmission side, and an internal arrangement of the PPP OAM processing unit 37 provided on the reception side, according to one embodiment of the present invention. In the transmission-sided PPP OAM processing unit 32, when a PPP frame is first received, the received PPP frame is saved in a FIFO 50. Also, in an OAM frame producing unit 52, an OAM frame having a PPP frame structure is produced. The production of this OAM frame is carried out in accordance with a monitoring result of another PPP packet signal, and a time out of an OAM transmission timer 51. Then, the OAM producing unit 52 controls a selector 53 so as to schedule transmissions of a user signal frame and an OAM frame. Then, the scheduled frame transmission is sent to the transmission-sided optical framer. In the reception-sided PPP OAM processing unit 37, when the signal sent from the reception-sided optical framer 38 is received, the PPP frame is derived, and subsequently, the FCS calculation is carried out in a PPP frame synchronizing unit 55. In this case, a calculation result (fault frame and discard frame) of FCS is saved in a frame counter 57. Next, while the PPP frame is saved in another FIFO 60, a PPP header analysis is performed by a PPP header analyzing unit 58. When this PPP frame is recognized as a PPP OAM frame, the recognized frame is transmitted to an OAM frame receiving unit 61, whereas when this PPP frame is recognized as the normal PPP frame, the recognized frame is sent to a down stream. In the OAM frame receiving unit 61, the OAM frame is analyzed.

While a detailed operation will be explained with reference to FIG. 13 and the succeeding drawings, in the case that the apparatus owns the protection function, the OAM processing unit is connected to a block for controlling the switching function (indicated by a dotted line in this drawing).

As a first method for detecting a fault according to the present invention, there are provided a method for employing FCS of a PPP frame, and another method for employing a PPP OAM frame.

Figure 5:
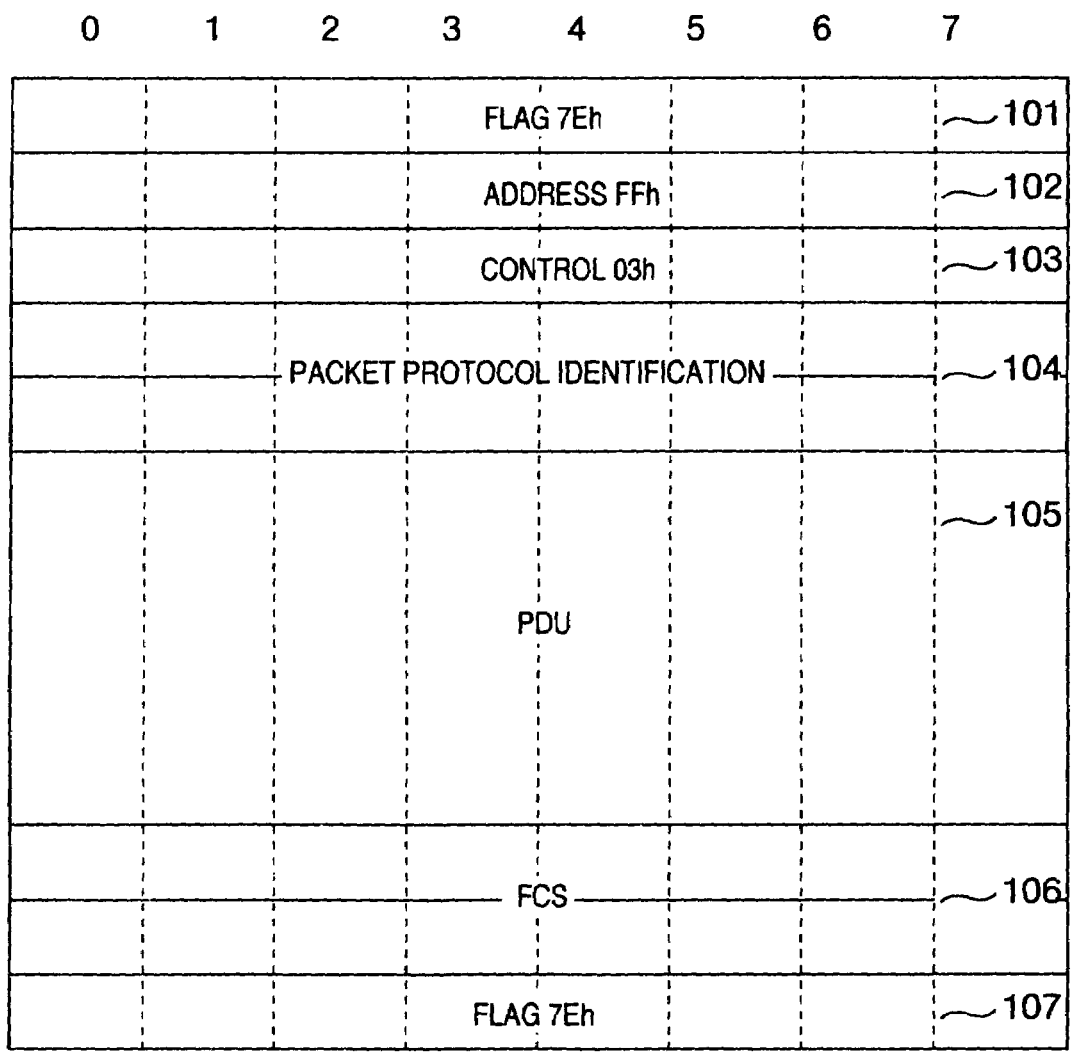
FIG. 5 schematically shows the PPP frame format defined by RFC 1662.

A description will now be made of the first fault detecting method, namely the method for employing FCS. In FIG. 5, there is shown the PPP frame format (RFC 1662). PPP owns as a header fields of: a flag 101, an address 102, a control 103, a packet protocol identification 104, PDU 105, FCS 106, and a flag 107. Among these fields, the FCS field corresponds to a field for detecting a frame error. When an error happens to occur in a frame during transmission, this error can be detected. As a consequence, FCS is checked every time the PPP frame which is multiplexed on the optical channel is received, so that both a total number of normal frames and a total number of error frames can be counted. Therefore, if the total number of normal frames and the total number of error frames are monitored, then a performance of a transmission path can be measured. For instance, in such a case that a total number of error frames per unit time is larger than, or equal to a predetermined number, it is possible to identify that optical channel is in fault status. Alternatively, in the case that a ratio of the error frame number to the normal frame number per unit time is greater than another predetermined number, it is possible to identify that the optical channel is in fault status. Also, when none of the frames are transmitted during a predetermined time period, since the performance measurement cannot be performed, if an empty frame is transmitted within idle time duration of the optical channel, then a preselected number of frames can be surely received. Therefore, the fault judgment can be determined based upon the above-explained method.

Figure 6:
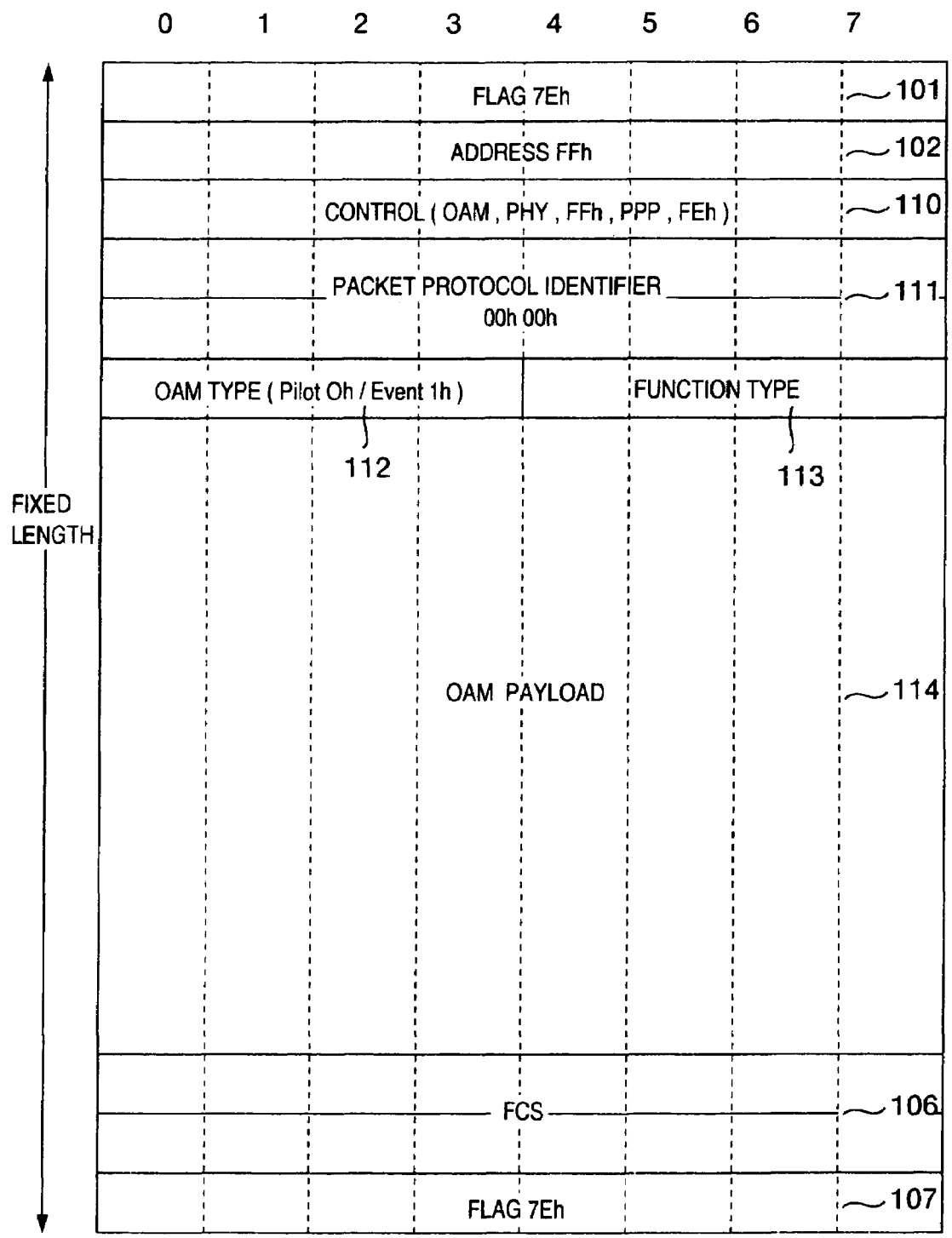
FIG. 6 shows one structural example of a PPP OAM frame format according to the present invention.

A description will now be made of the second fault detecting method, namely the method for employing the PPP OAM frame. FIG. 6 represents a PPP OAM frame format according to the present embodiment. It should be noted that the frame format itself owns the compatibility with the above-explained PPP frame format shown in FIG. 5. In accordance with the present embodiment, the OAM frame is defined and is identified, or discriminated from another PPP frame. In the PPP format, an address 102 is fixed by FFh, and a control 103 is fixed by 03h. In this case, a novel code is defined in a code for a PPP OAM frame, for example, a code for a PPP OAM frame is defined in the control 110. Furthermore, if the field of control 110 is set to a code that is different from the code of a PPP OAM frame, the frame set to the code can be used as an OAM frame of a lower layer of a PPP layer. In this embodiment, when the field of control is set to FFh, this field is defined as a PPP OAM frame for OAM of the lower-grade layer; and when the field of control 110 is set to FEh, this field is defined as a frame for OAM of the PPP layer. It should be noted that although the length of the PPP frame is originally variable, the length of this PPP frame may be fixed in order to easily process the PPP OAM frame. As a payload 114 of PPP OAM, an OAM type 113, a function type 112, and fields for each function are defined. In this embodiment, as the OAM function, an OAM frame which is periodically sent out is defined as a pilot OAM, and an OAM frame which is produced in response to an event is defined as an event OAM, and thus, the discrimination is made based on the sorts of OAM. As the function of this pilot OAM, for example, a performance monitoring function and an alarm transfer function are defined. As the event OAM function, an on-demand connectivity test and the like such as a fault notification may be conceived. In the case of this pilot OAM, there is such a feature that the performance and the like can be continuously monitored. In the case of this event OAM, there is such a feature that the event can be immediately notified. The pilot OAM frame is periodically transmitted by the OAM transmission timer 51, and this transmission period may be conceived as, for example, 1 second.

Figure 7:
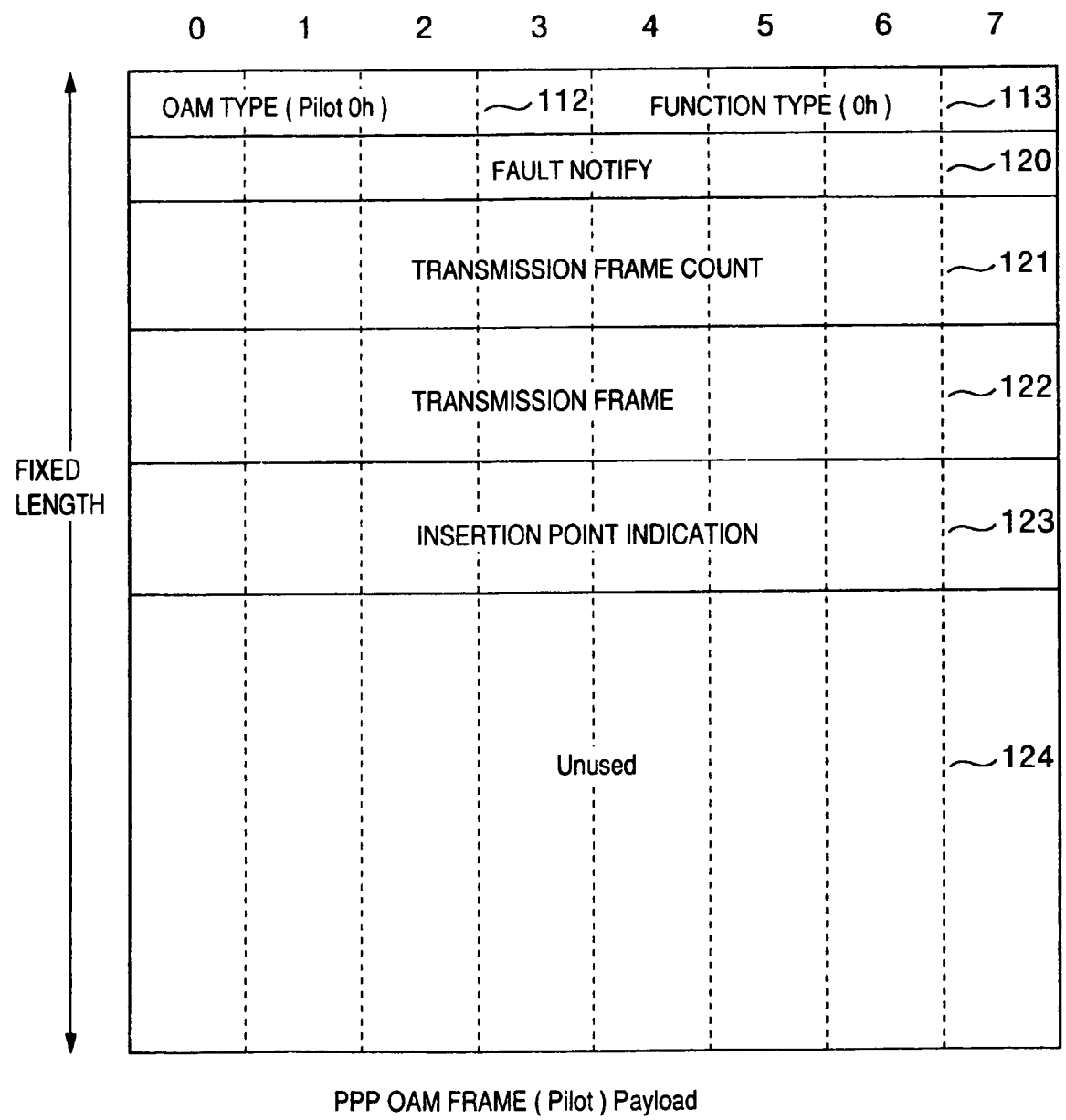
FIG. 7 indicates another structural example of a PPP OAM frame format according to the present invention.

FIG. 7 indicates a structure of an OAM payload of a pilot OAM frame according to one embodiment.

For instance, the following items are listed up as the function of this pilot OAM frame:

(1). A function to periodically execute a fault notification when a fault happens to occur (fault notification 120).

(2). A function in which a total number of frames transmitted after a previous pilot OAM frame has been produced until a next pilot OAM frame is produced is mapped on the transmission side, and a total number of received frames is compared with the total number of mapped frames on the reception side, so that a total number of lost frames is measured (121).

(3). A function in which BIP of frames transmitted after a previous pilot OAM frame has been produced until a next pilot OAM frame is produced is calculated to be mapped on the transmission side, and the calculated value is compared with the value of mapped frames on the reception side, so that a bit error is detected (122).

(4). A function to indicate an insertion point of a pilot OAM frame (123).

The performance degradation can be monitored by periodically sending out this pilot OAM frame. As the monitoring method, the performance degradation can be measured by executing the above-described items (2) and (3).

It should also be noted that these OAM frames are formed as such a format transmitted from the transmission side to the reception side. In such a case that a communication condition is required to be grasped even on the transmission side, a report OAM frame may be transmitted from the reception side to the transmission side, and otherwise, an OAM frame is returned to a transmission point.

As the example for conducting the OAM function into the adaptation, the method for conducting the OAM function into the PPP protocol has been described. Alternatively, the OAM function may be arranged in other adaptation function than the PPP protocol. For instance, HDLC and the like, which own a frame format similar to that of PPP, may be used as an adaptation protocol. In this case, such an OAM function, as explained in the example of PPP may be employed. Since the addresses may be allocated to the respective connections in the case of HDLC, a plurality of links may be stored into the same transmission path. Also, the OAM function may be carried out with respect to the respective connections. Also, all information about the respective connections to be stored may be collectively acquired, and may be actuated as the OAM function in the unit of the transmission path. For example, as to a total number of transmitted frames, a total number of transmitted frames for combining all of the connections is counted, and this information is stored on the OAM frame, and then the resultant OAM frame is sent out to the down stream. At a termination point of the transmission path, a total number of received frames of each of the connections is collectively counted. Then, this number of counted frame is identified with the number of transmitted frame on the transmission side, which is stored on the OAM frame so as to calculate a frame loss ratio. As a consequence, the fault condition (for example, SES, i.e., "Severely erred second") of the transmission path can be measured by employing the frame.

Figure 8:
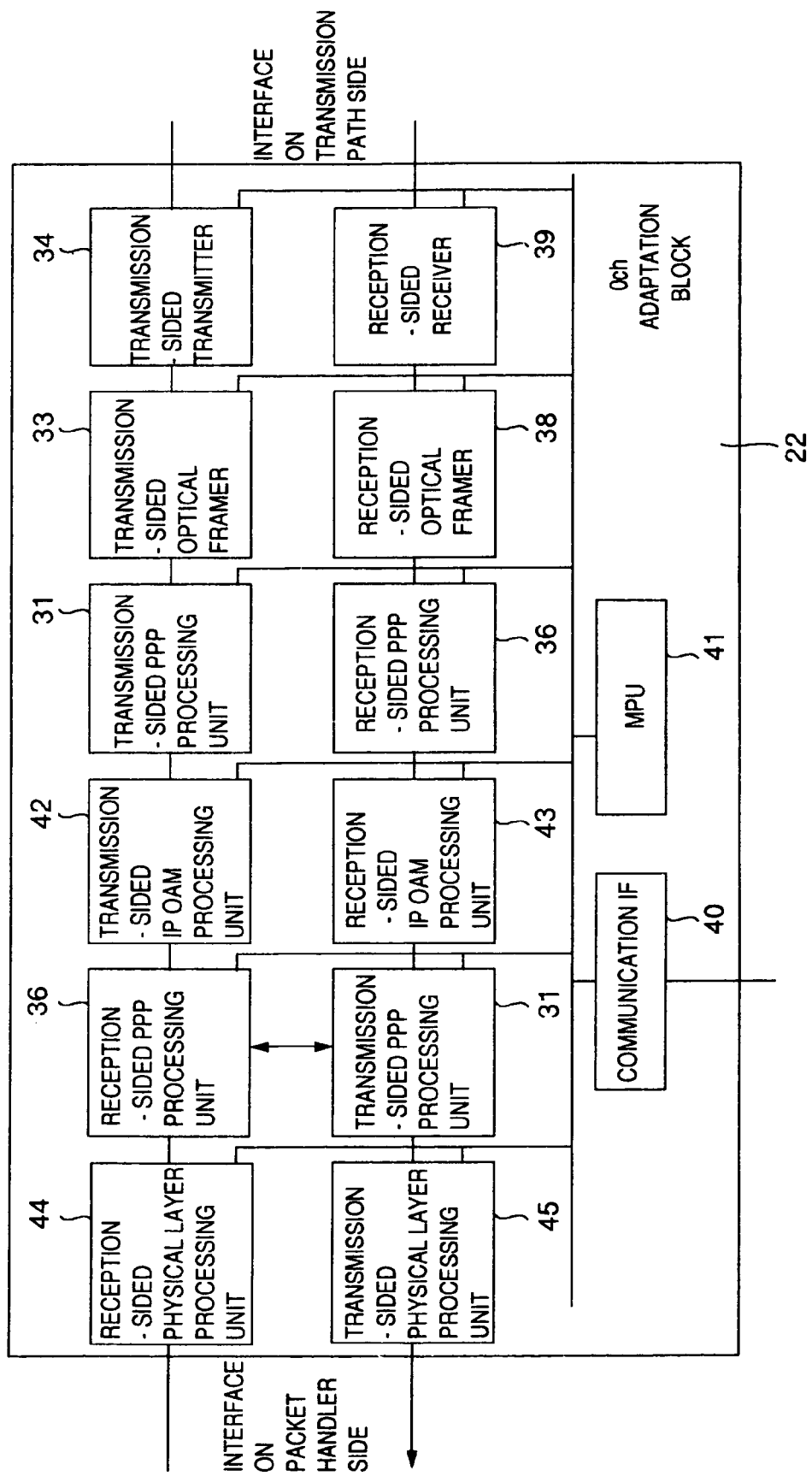
FIG. 8 is a schematic block diagram for indicating an optical channel adaptation block according to another embodiment of the present invention.
Figure 9:
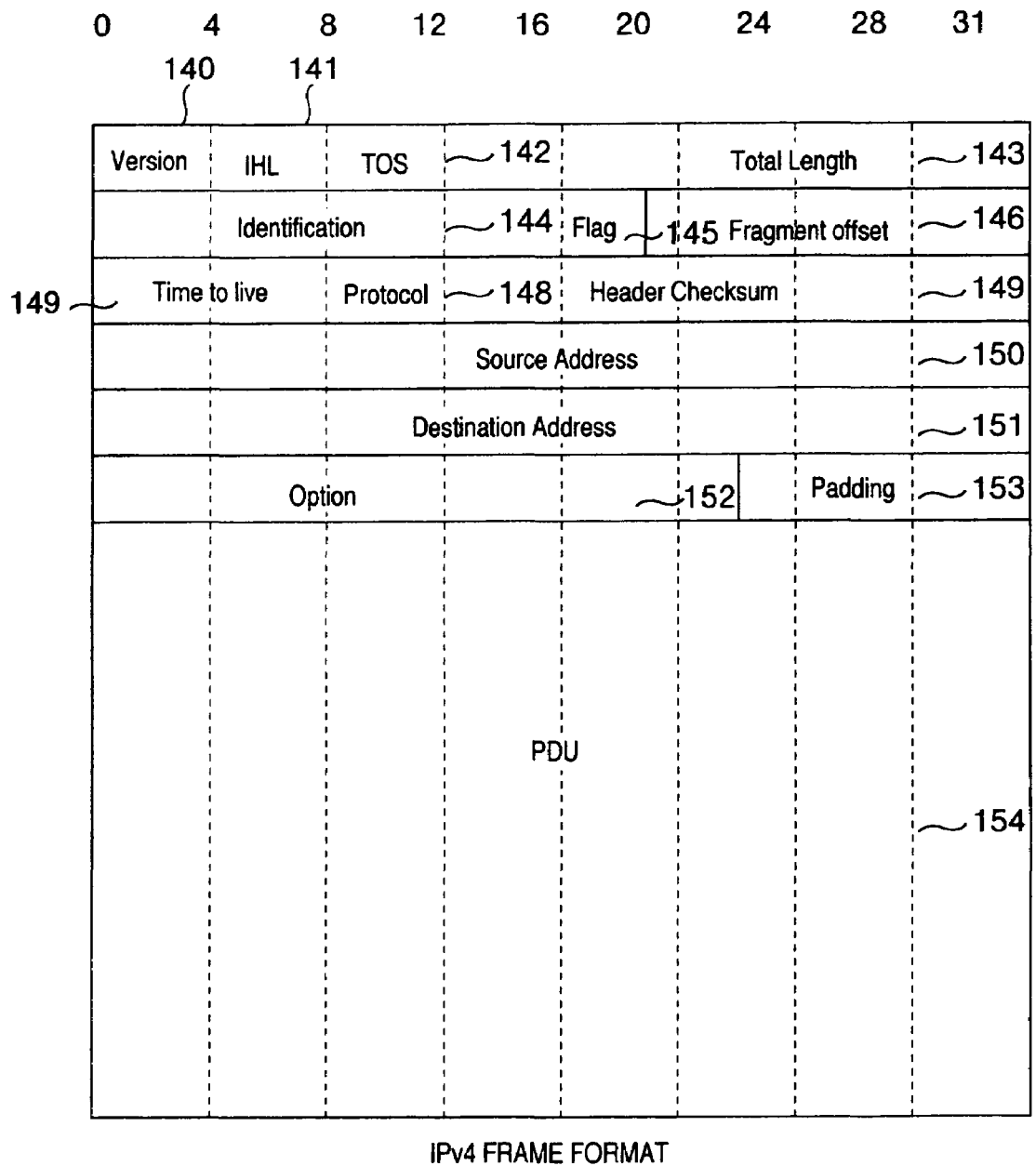
FIG. 9 schematically represents the IP frame format defined by RFC 791.

Referring now to FIG. 8 and FIG. 9, the optical channel fault detecting method as the function of the IP layer will be described.

FIG. 8 indicates an internal arrangement of the optical channel adaptation block 22 in such a case that the OAM function is provided on IP, according to one embodiment. In an IP OAM processing unit 42 provided on the transmission side, an IP OAM packet is produced which has the same format as that of the IP packet. In an IP OAM packet processing unit 43 provided the reception side, an IP OAM packet is discriminated from the transmitted IP packet so as to execute an IP OAM packet processing operation.

FIG. 9 indicates an IPv4 packet format. In the IP OAM packet, for example, an IP OAM packet dedicated code is defined in a Protocol field 148 so as to execute the identification among the IP packet format.

As a function, it is conceivable to realize a similar function to the above-explained PPP OAM function. Alternatively, it is also conceivable to perform the performance monitoring by carrying BIP and a total number of transmission packets on the ICMP protocol. Also, as to the connectivity test, it is conceivable to periodically send ICMP.

As to the OAM function by the IP packet, the fault condition of the transmission path can be measured by way of the method (grouping method) for counting the IP packets which pass through a certain transmission path. For example, the fault condition (for example, SES, i.e., severely erred second) of the transmission path may be grasped by such a way that a total number of IP packets transmitted is counted and then the counted total number is stored on the OAM packed in the transmission interface to the transmission path, whereas a total number of received IP packets is counted, and this counted total number is compared with the total number of transmitted packets stored on the received OAM packets on the reception side of the transmission path.

The method for detecting the fault occurred in the optical channel by modifying PPP and the IP layer has been described in the above description.

Figure 10:
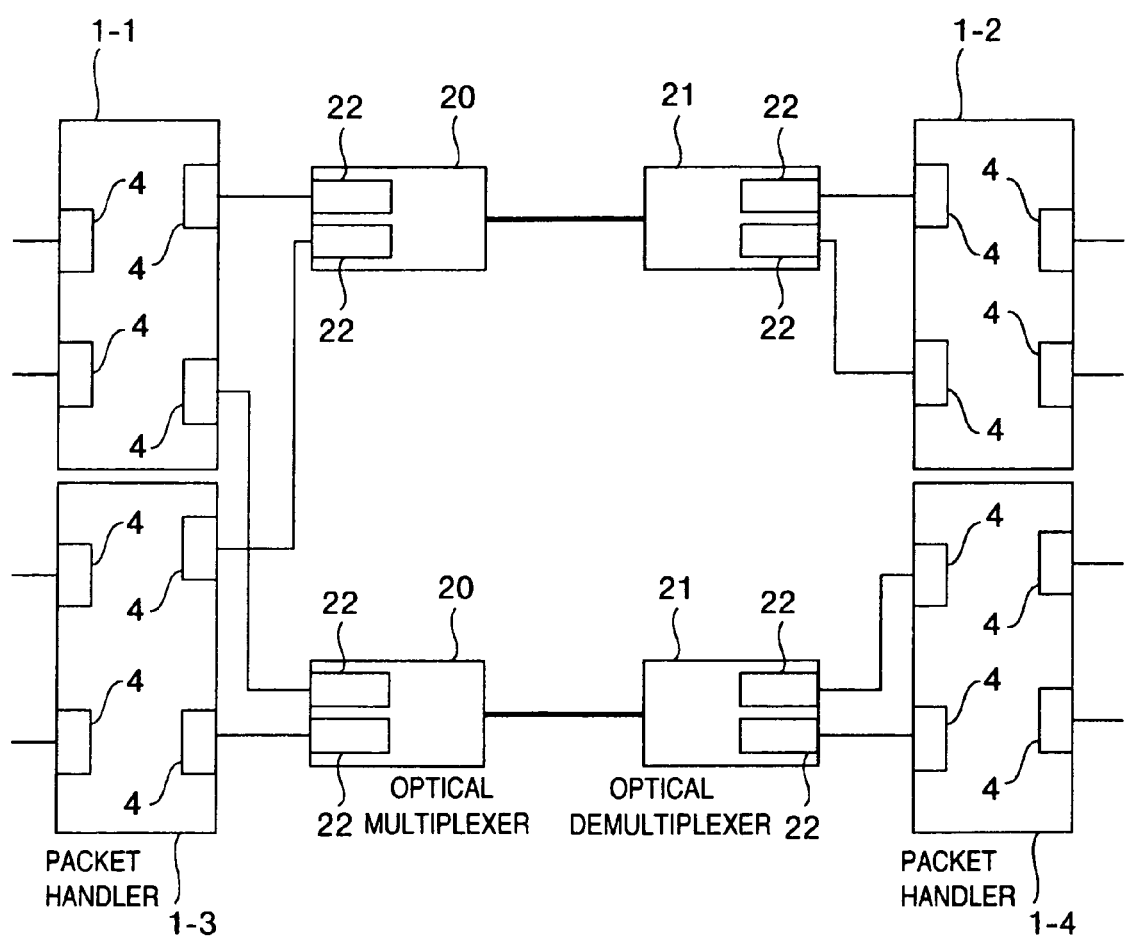
FIG. 10 schematically indicates a structural example of a packet handler and an optical network, according to another embodiment of the present invention.

As an embodiment of the method for arranging the adaptation function, such a structure that an optical channel adaption block 22 is owned in an optical multiplexer 22 and an optical demultiplexer 21 is represented in FIG. 10. In this arrangement, the optical channel adaptation block 22 is inserted into the optical multiplexer 20 and the optical demultiplexer 21 as interfaces thereof. Since these structural integration of the apparatus is made, the cost of the network can be reduced.

Figure 11:
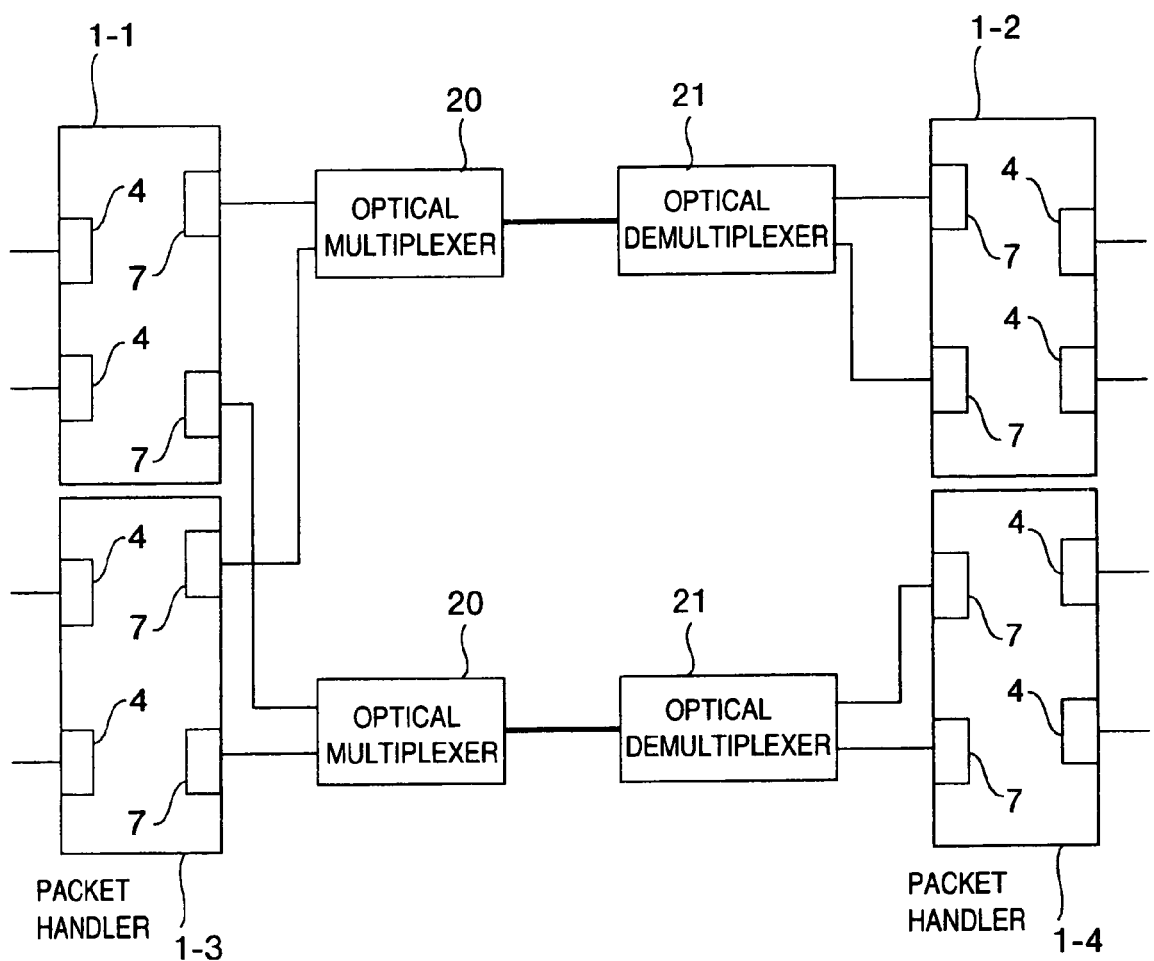
FIG. 11 schematically indicates a structural example of a packet handler and an optical network, according to another embodiment of the present invention.

FIG. 11 represents another embodiment of the adaptation function arranging method. This arrangement is made such that an adaptation function of a packet to an optical channel is given to a packet handler 1. The packet handler 1 has an optical channel interface 7, and a frame OAM function is provided by this optical channel interface 7.

Figure 12:
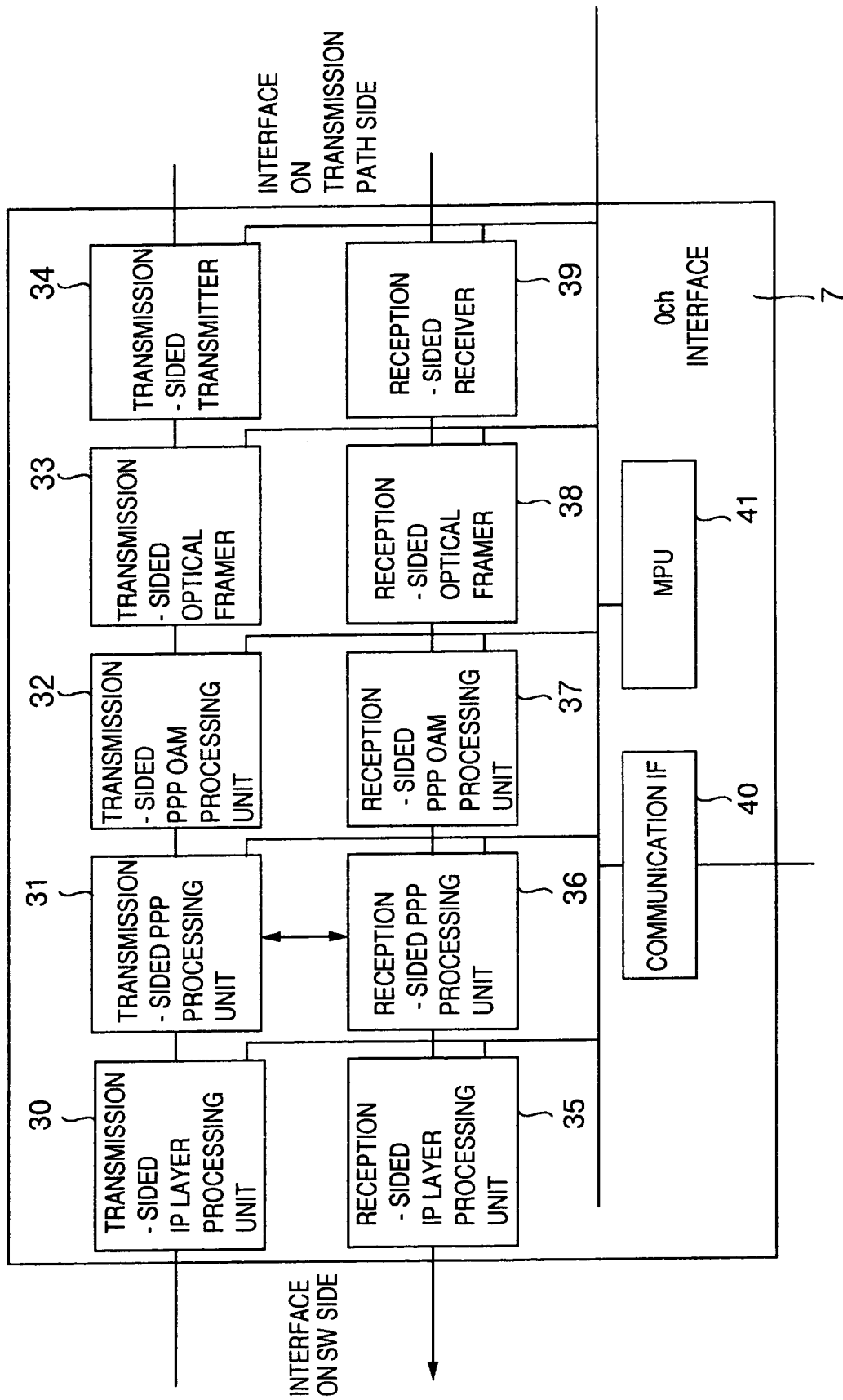
FIG. 12 is a schematic block diagram for showing one structural example of an optical channel interface card of the packet handler according to the present invention.

FIG. 12 shows an arrangement of the optical channel interface 7. In this embodiment, an adaptation of a packet to an optical channel is carried out by using the PPP protocol. A first description will be made of functions on the transmission side. In an IP layer processing unit 30 provided on the transmission side, a process related to an IP layer is performed. In a PPP processing unit 31 provided on the transmission side, an IP packet is encapsulated by a PPP frame. In a PPP OAM processing unit 32 provided on the transmission side, an OAM frame having a similar structure to that of the PPP frame is produced, and then this produced OAM frame is multiplexed with the PPP frame sent from the transmission-side PPP processing units. In an optical framer 33 provided on the transmission side, a digital coding operation is carried out so as to send out the frame to the optical path, and after this signal is converted by the electro-optical conversion by a transmitter provided on the transmission side, the converted signal is transmitted to the optical network. Next, a function on the reception side will now be explained. The optical-electronic conversion is carried out in a receiver 39 provided on the reception side. In an optical framer provided on the reception side, a digital decoding operation is carried out from the electrically converted signal. Next, in a PPP OAM processing unit 37 provided on the reception side, a PPP frame is derived; an OAM frame is extracted; a monitoring operation is carried out; and FCS of the PPP frame is checked so as to detect performance degradation of the optical channel. In a PPP processing unit 36 provided on the reception side, the IP packet is derived from the PPP frame. In an IP layer processing unit 35 provided on the reception side, process operation of the IP layer such as a TTL decrement is carried out. Furthermore, an outgoing path is determined by a header, and an internal header is applied.

As previously explained, the performance degradation detecting method for the optical channel according to the embodiment has been represented. Subsequently, a description will now be made of such a system that performance degradation detection information in a packet layer is transmitted to an optical layer, and an optical channel is switched based upon this performance degradation detection information.

Figure 13:
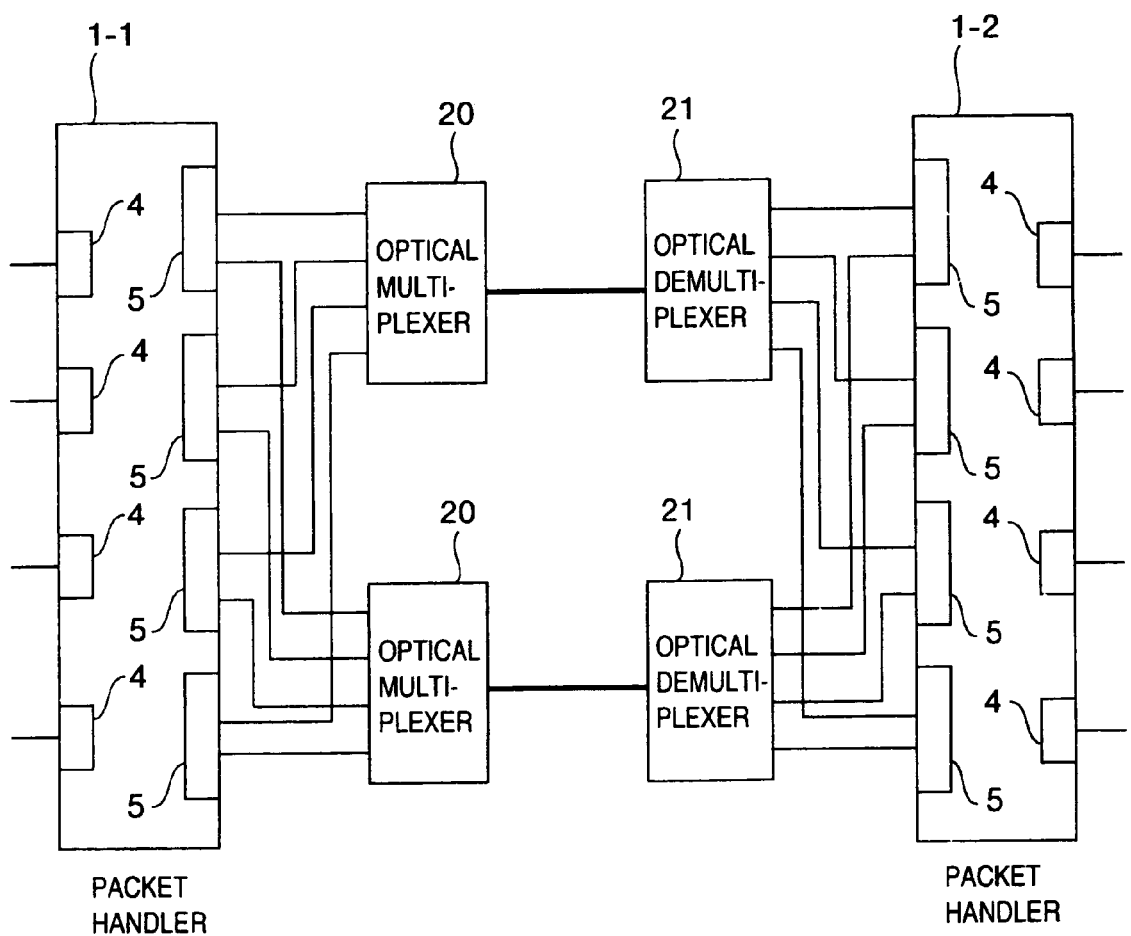
FIG. 13 schematically indicates a structural example of a packet handler and an optical network, according to another embodiment of the present invention.

FIG. 13 schematically shows an example for realizing a packet handler, and a network for supporting an optical channel having a redundant structure. In this drawing, the optical channel connected to the packet handler 1 is duplicated, and the duplicated optical channels are connected to an optical IF block 5 having a redundant structure. In this embodiment, a description will now be made of such a case that the optical channels employ the redundant structure of 1+1 (the same signals are transmitted to the duplicated optical channels on the transmission side, whereas only one signal is selected on the reception side). It should be understood that the present invention is not limited to the redundant structure of 1+1. The optical channels having one pair of redundant structures and outputted from a packet handler 1-1 are connected to, for instance, separately-provided optical multiplexers 20. In these optical multiplexers 20, these optical channels are wavelength-multiplexed with other optical channels, respectively. Then, the wave-length-multiplexed optical channels are reached via different optical fibers to an optical demultiplexer 21 provided on the reception side. In this optical demultiplexer 21, the optical channels are demultiplexed every optical channel, and thereafter the demultiplexed optical channels are connected to a packet handler 1-2 provided on the reception side. In accordance with the arrangement of this embodiment, when a cut of an optical fiber and signal performance degradation are detected, since the optical channel is duplicated, if the switching operation is initiated, then the fault can be avoided.

Figure 14:
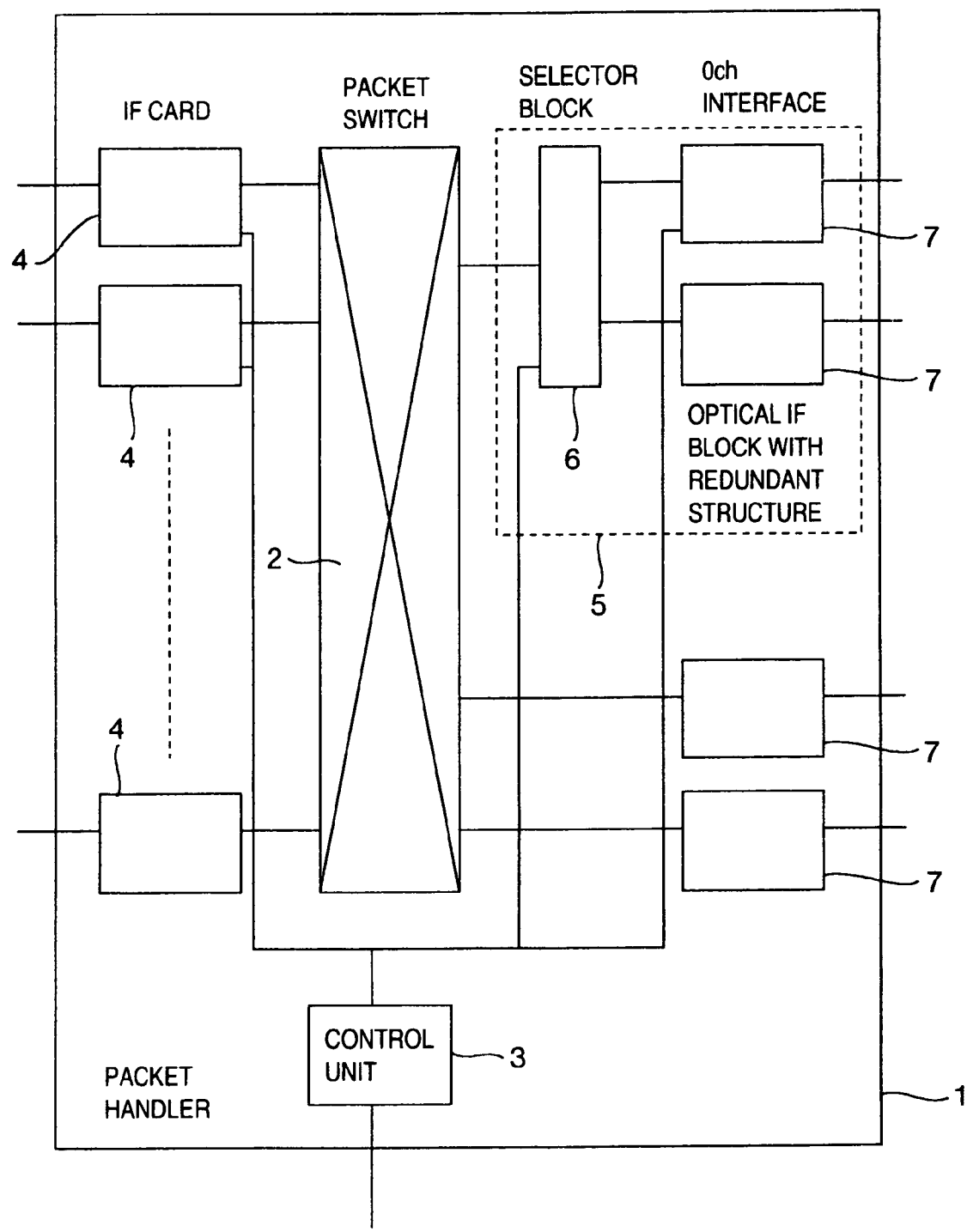
FIG. 14 schematically shows an internal arrangement of the packet handler according to the present invention.

FIG. 14 schematically shows a packet handler 1-1, according to an embodiment of the present invention, capable of detecting a fault when a transmission performance is degraded, and also capable of initiating a switching operation of a transmission path. A block for connecting optical channels having redundant structures will be collectively referred to as "an optical IF block 5 having a redundant structure". In this embodiment, this optical IF block 5 with the redundant structure is arranged by one pair of an optical channel interface 7 and a selector block 6. The optical channel interface 7 stores an optical channel. On the reception side, an optical layer is terminated. An IP packet is derived from the optical channel. After the derived IP packet has been processed within this optical channel interface 7, the processed IP packet is transmitted to a packet switch 2. Also, on the transmission side, the IP packet is mapped to the optical channel, and the mapped IP packet is transmitted. The optical channel interface of this embodiment owns a performance degradation detection function of the transmission path (a detailed detection function will be explained with reference to FIG. 15). The selector block 6 connects an optical channel having a redundant structure, and owns such a function that a signal is duplicated on the transmission side, whereas a signal is selected on the reception side. The fault information of the transmission path detected by the optical channel interface 7 is notified to the selector block 6, and the failure point can be avoided by switching the selector. The packet switch 2 owns such a function to transmit an input packet to a desirable output port based on the header information. Also, a control unit 3 may control an overall system of the packet handler 1.

Figure 15:
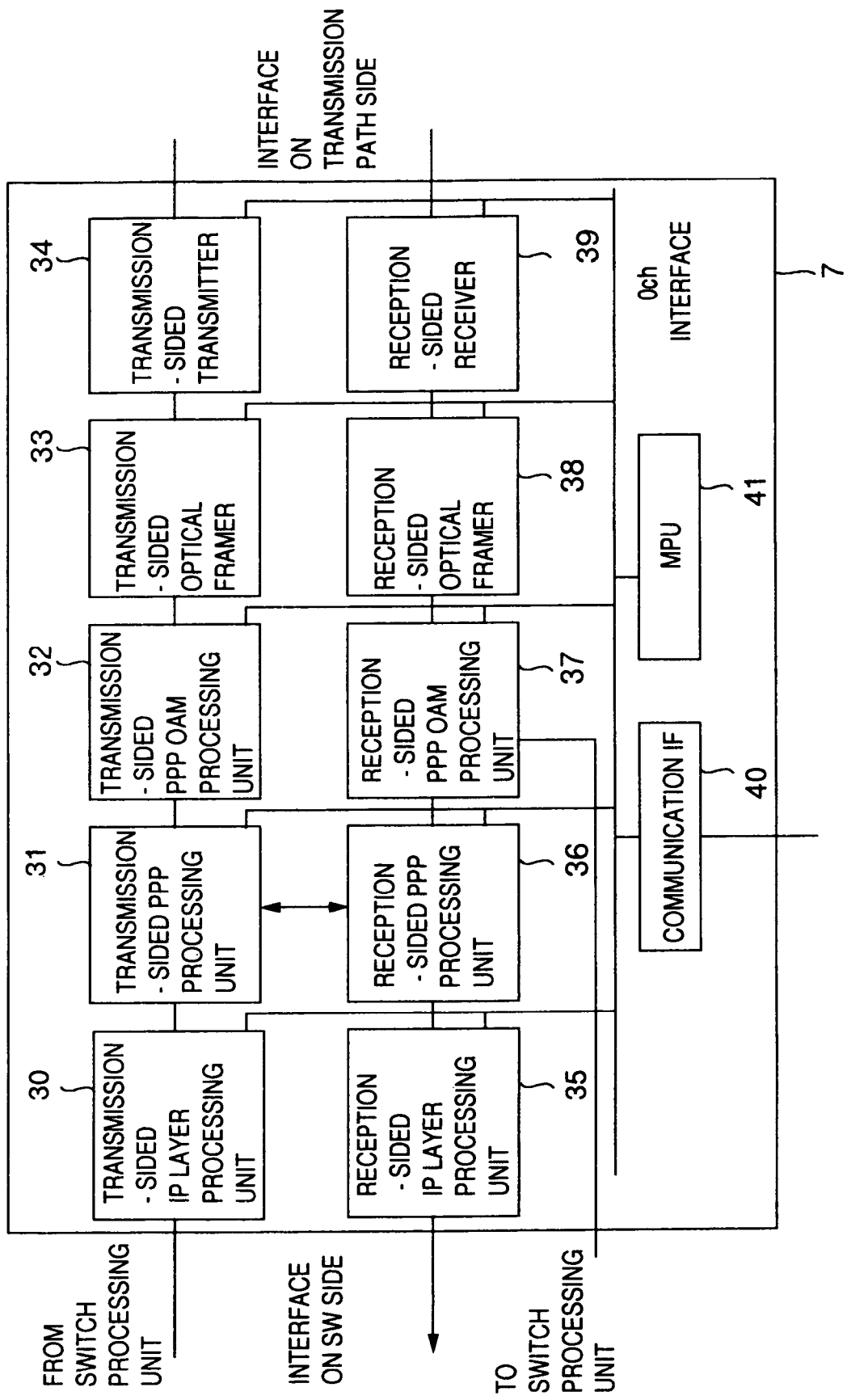
FIG. 15 is a block diagram for indicating a structural example of an optical channel interface card employed in the packet handler according to the present invention.

FIG. 22 is an explanatory diagram for explaining a protection switching sequence of a transmission path when a transmission performance is degraded. In this drawing, a packet flow is directed from a packet handler 1-1 to another packet handler 1-2. Also, this embodiment describes such a case of a protection of 1+1 (namely, redundant structure featured by that while the same signals are supplied to both a working path and protection path system, these similar signals are selected in a down stream). An IP packet is duplicated in a selector block of the packet handler 1-1 to the working path and the protection path. In an optical channel interface in the working path and also an optical channel interface 7 in the protection path, a performance of a transmission path is monitored, and a control packet for notifying this monitoring result to the down stream is inserted. In the optical channel interface 7 provided on the reception side, the performance monitoring operations are carried out, respectively. Then, the performance of the transmission path is measured by comparing the performance monitored results with the information of the transmission side carried on the controlling packet. Now, when a fault occurred in the transmission path of the working path is found out, the optical channel interface 7 notifies the fault information to the selector block. This notification may trigger to switch the selector, so that the fault location avoiding operation is accomplished. It should also be noted that this embodiment describes such a case that the judgement of the fault is arranged in the selector block. Alternatively, such an arrangement may be conceived that while all information is collected by the control unit 2, the fault is judged. FIG. 15 schematically represents an embodiment of an optical channel interface 7 having a fault detection function of an optical channel, and also a notification interface to a selector block. A control line is derived from a PPP OAM processing unit 37 provided on the reception side. This control line is used to notify either a fault detection or a switching request. This control line is connected to either a selector block 6 or an optical selector block 8, which will be explained with reference to FIG. 16 and FIG. 18. Also, another control line is extended from either the selector block 6 or the optical selector block 8 to a PPP OAM processing unit 32 provided on the transmission side.

Figure 16:
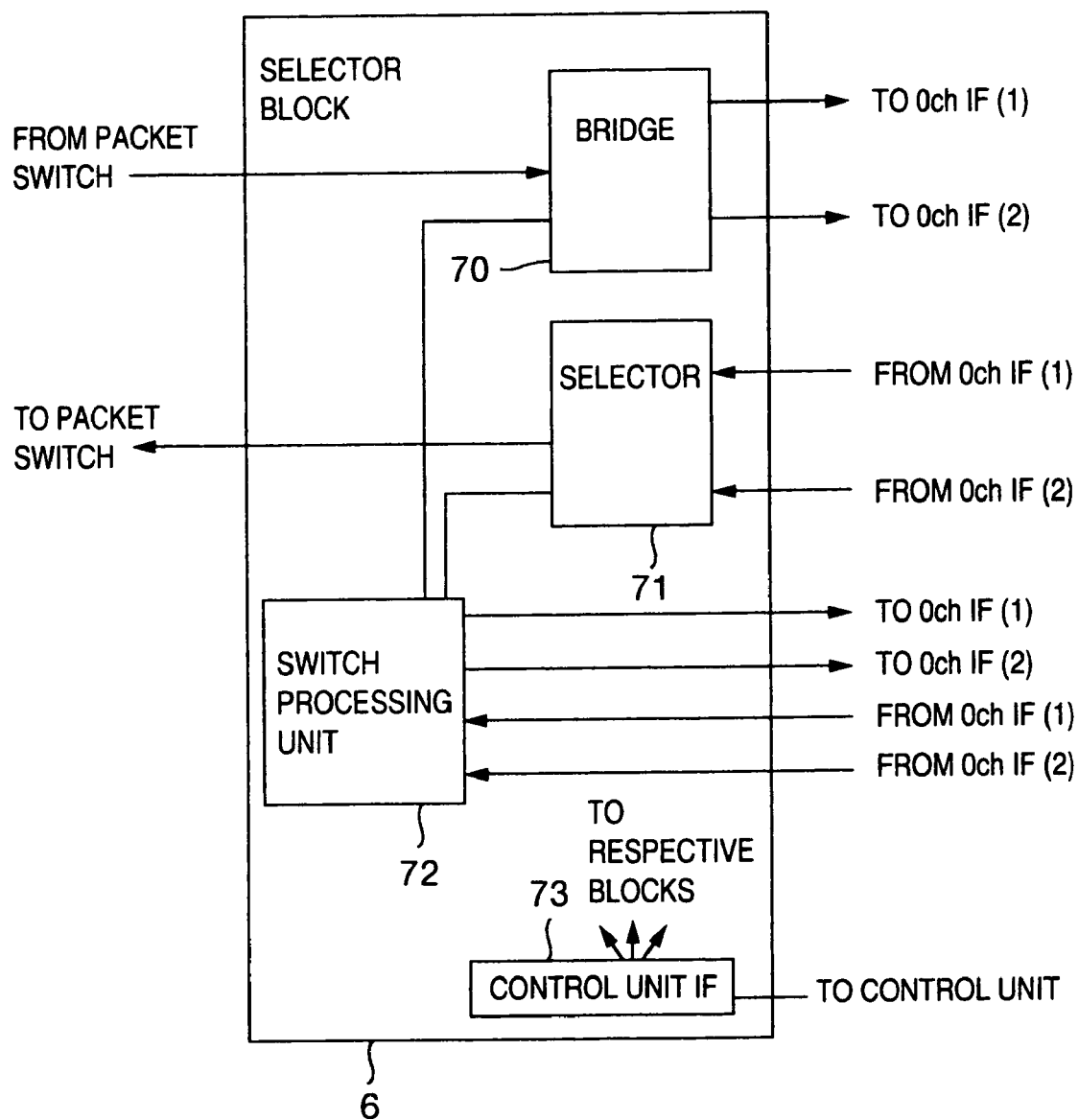
FIG. 16 is a schematic block diagram of a selector block employed in the packet handler according to the present invention.

FIG. 16 indicates a structural example of the selector block 6. In the selector block, on the transmission side, a signal is duplicated by a bridge 70 and the duplicated signals are transmitted to the optical channel interface 7 of the working path, and the optical channel interface 7 of the protection path. Also, on the reception side, a selector 71 is provided so as to pass only the signal of the working path. Then, this signal is sent to the packet switch 2. These selector and bridge provided on the reception side are controlled by a switch processing unit 72. The switch processing unit 72 receives the above-described fault information of the optical channel from the optical channel IFs of both the working/protection path, and initiates the switching operation with respect to the protection path when the working path is brought into the fault condition. In this case of (1+1) switching operation, if the fault is detected on the reception side, then the system can be switched based upon only the judgement made on the reception side.

Figure 17:
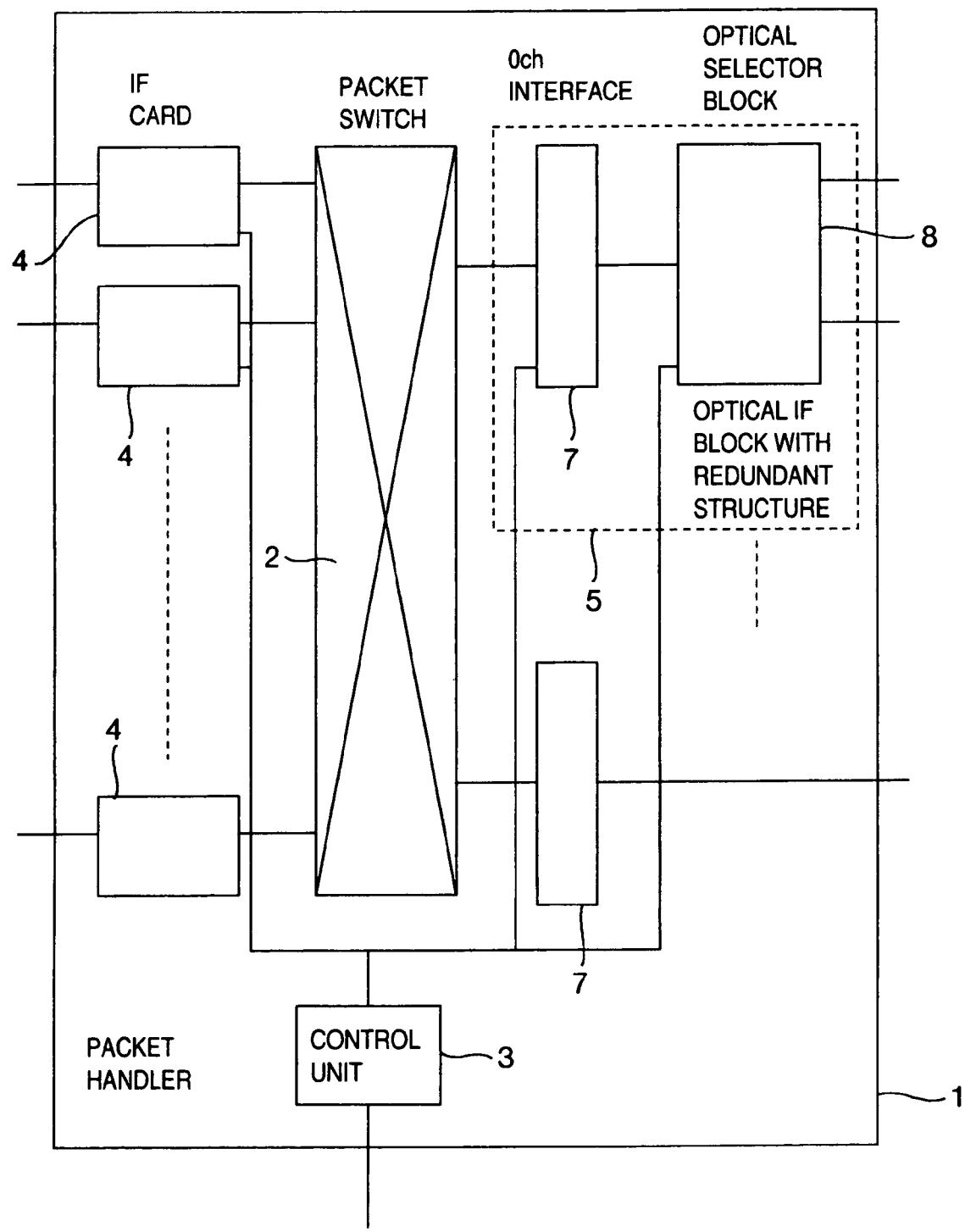
FIG. 17 is a schematic block diagram for representing a structural example of a packet handler according to another embodiment of the present invention.

FIG. 17 indicates another embodiment of the packet handler 1 according to the present invention. In the embodiment of FIG. 3, the signal duplicating/selecting functions of the signal are arranged at the portion where the signal is electrically handled. In this embodiment, the following feature is made. That is, the signal duplicating/selecting functions are arranged at a portion where a signal is handled as light. As to a signal on the transmission side, a packet is transmitted from a packet switch 2 to an optical channel interface 7; an IP layer is processed in an optical channel interface 7; and an electric processing operation such as a PPP framing operation is carried out. Thereafter, the processed signal is transmitted to an optical selector block 8 by a transmitter. In the optical selector block 8, the signal is duplicated, and the duplicated signal is sent out to the optical network. As to a signal on the reception side, a signal of the working path and a signal of the protection path are received by the optical selector block 8, the signal of the working path is selected, and only the signal of the working path is transmitted to the optical channel interface 7. In the optical channel interface 7, an optical signal is converted into an electric signal. Then, the electric process operation such as the PPP process operation and the IP process operation is carried out with respect to this electric signal, and then the packet is sent to the packet switch 2.

Figure 18:
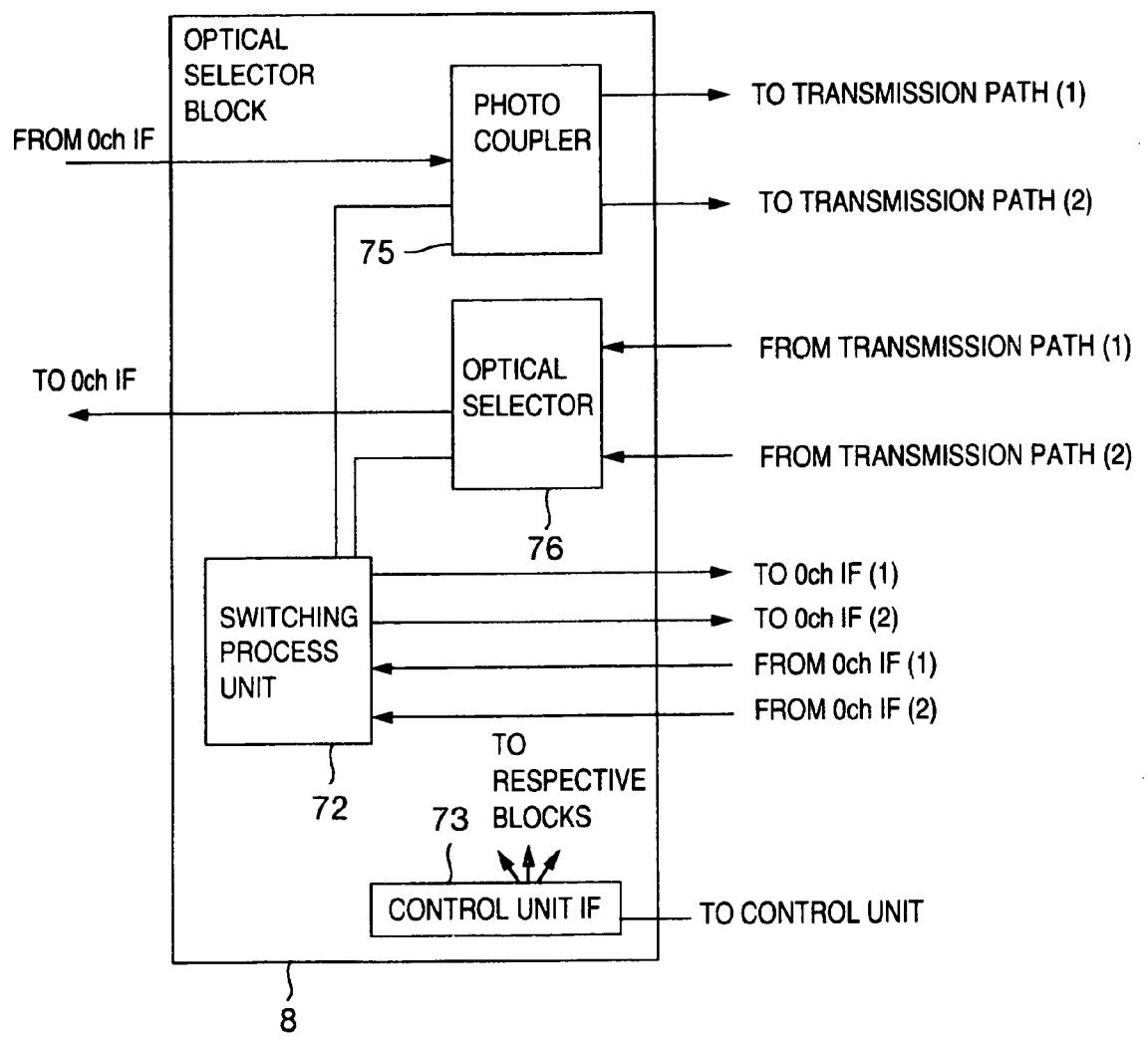
FIG. 18 is a schematic block diagram of another selector block employed in the packet handler according to the present invention.

FIG. 18 represents a detailed arrangement of the optical selector block 8. On the transmission side, when an optical signal is received from an optical channel interface 7, the optical signal is duplicated by an optical coupler 75, and then, the duplicated signals are sent to both the working path and the protection path. On the reception side, when the signals are received from both the working/protection path, only the signal of the working path is selected by the optical selector 76, and then the selected signal is sent to the optical channel interface 7. A switch control unit 72 controls these signal switching operations, and may determine the working path based upon the fault information detected by the optical channel interface 7, and in response to an instruction issued from the control unit. Moreover, a loss of signal (LOS) detecting function is provided in the receiving unit of the optical signal, and this information may be employed as the judging material used to determine the working path.

As previously explained, the various embodiments of the methods for switching the optical channels connected between the packet handlers have been represented. In these embodiments, the (1+1) optical channel switching methods have been represented. However, the above-described failure detecting method may be similarly applied to either (1+1) switching method or (m:n) switching method. Also, if such a channel used to communicate a protocol between both ends during a switching operation is provided, then this optical channel switching method may be applied also to the (1:1) switching operation, and the (m:n) switching operation. As the structural example of the monitoring channel, the following systems may be conceived; a method via an operation network, a method for providing an optical monitoring channel, a method for communicating with employment of a controlling packet, and a method for employing a controlling frame.

Next, a description will now be made of a fault detecting method for an optical channel in an optical apparatus in the case that an optical channel is connected between packet handlers 1, and furthermore, such an optical apparatus as an optical cross-connect (OXC) 11 is arranged between these packet handlers, and further a fault restoration method in such a case that a redundant arrangement is provided at a portion (sub-network connection) of an optical channel.

Figure 19:
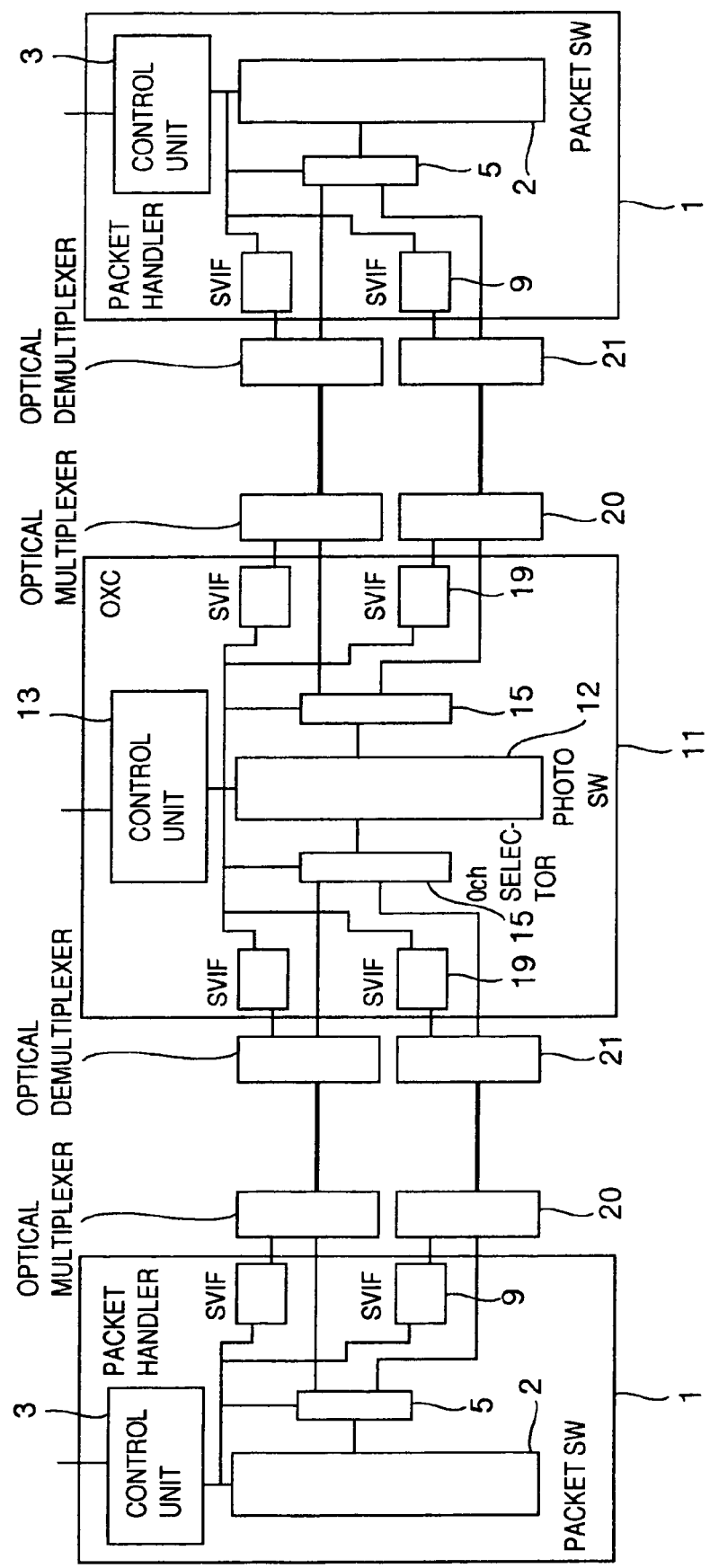
FIG. 19 schematically illustrates an arrangement example of an optical network structure, an optical cross-connect structure, and a packet handler, according to another embodiment of the present invention.

FIG. 19 schematically indicates one structural example of an optical network having an optical channel fault detecting mechanism, and also a fault restoration system, which is constituted by the packet handler 1 and the optical cross-connect 11 according to the present invention. The optical cross-connect 11 shown in this drawing employs such a structure for storing an optical channel having a redundant structure. In the optical cross-connect 11 of this drawing, the optical channel is not terminated, but one section of the optical channel can be switched. On the reception side, the optical channel is inputted to the optical channel selector 15, a signal in a working path is selected in this optical channel selector 15, and then the selected signal is entered into the optical switch 12. On the transmission side, the signal is duplicated by the optical channel selector, and the duplicated signals are sent to the transmission paths of both the working/protection path.

Figure 20:
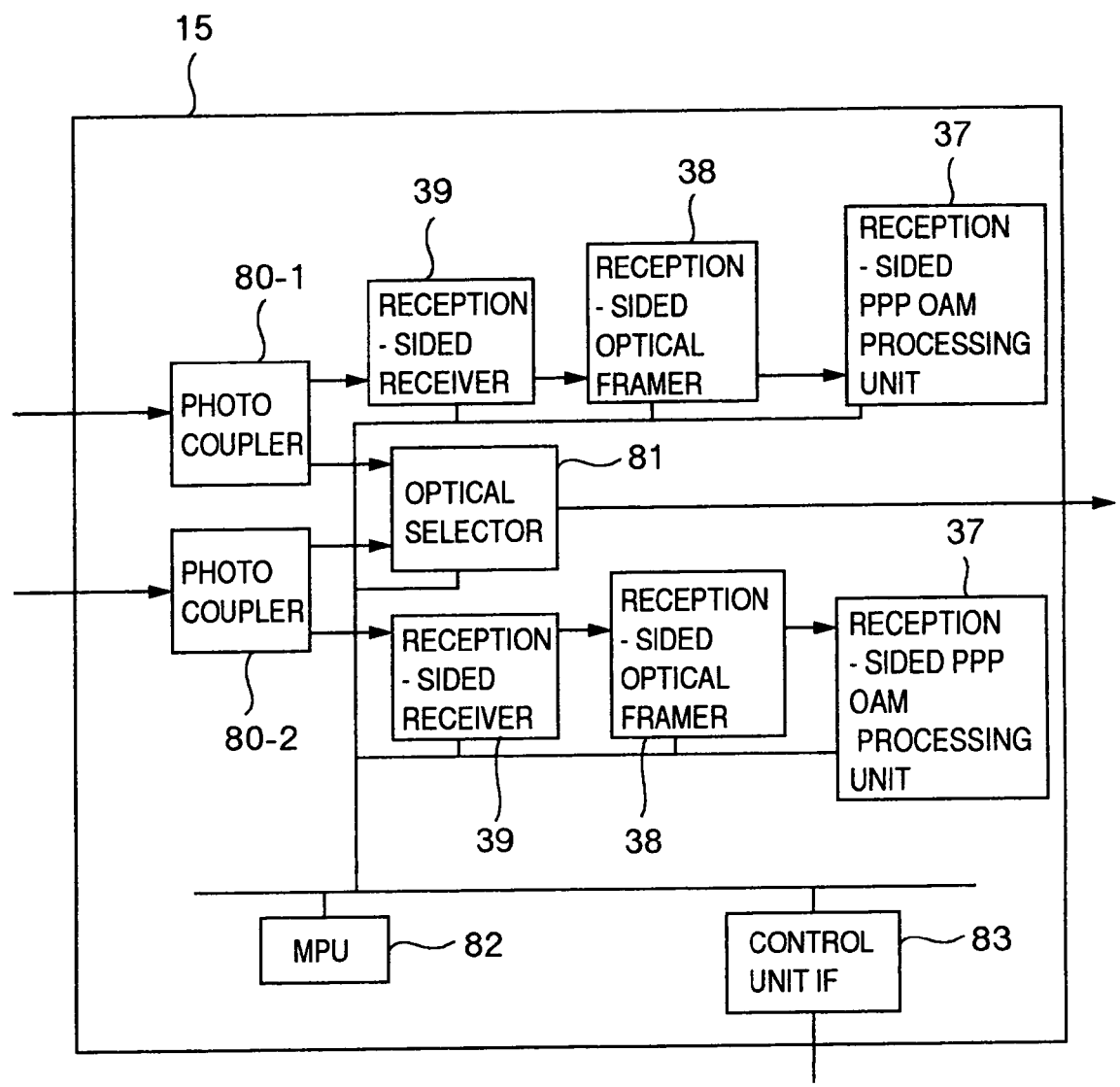
FIG. 20 shows a schematic block diagram of an optical channel selector card employed in the optical cross-connect apparatus of the embodiment of the present invention.

Assuming now that performance degradation of an optical channel is detected by employing an optical element, a detection item is only limited to a loss of signal (LOS) detection. As a consequence, in accordance with the optical cross-connect 11 of the present invention, the optical channel selector may own such a function that when an optical signal may pass through this optical channel selector and at the same time, the optical signal is duplicated, the duplicated optical signals are monitored in order to monitor performance degradation of the optical channel. Concretely speaking, the duplicated optical signal is converted into an electric signal, and this electric signal is electrically analyzed so as to measure performance degradation of the electric signal. FIG. 20 indicates an embodiment of a reception-sided circuit of the optical channel selector 15. Signals which are entered from both the working path and the protection path are duplicated by optical couplers 80, respectively. As to a main signal, after the working path is selected by the optical selector 81, the selected main signal is transmitted to the optical switch 12. As to the duplicated signal to be monitored, the opto-electric converting process operation is carried out in a receiver 39 provided on the reception side. Thereafter, the processed signal is sent via an optical framer 38 to a PPP OAM processing unit 37 provided on the reception side. In this PPP OAM processing unit 37, an electrical fault detection is carried out, and then the fault information of both the working/protection path is notified to an MPU 82. In this embodiment, the MPU 82 selects the working path to set this selected working path to an optical selector.

When a signal monitoring operation is carried out, it is possible to detect that a failure happens to occur before the signal is received by the apparatus. However, it is difficult to identify such a fact that the fault occurs in which section up to this apparatus. To this end, in accordance with this embodiment, an optical monitoring channel (SV channel) function is additionally employed. An optical SV channel is a channel used to communicate information between apparatuses for constituting an optical network. A function for transmitting/receiving this information is provided in the optical cross-connect apparatus 11 and the packet handler 1 so as to communicate fault information of the optical channel. Concretely speaking, fault information related to an optical channel detected by a certain apparatus is notified via an optical monitoring channel to an apparatus in a down stream, to which this optical channel is connected. In the apparatus of the down stream, the fault information sent from the apparatus of the up stream is compared with the fault information monitored in the own apparatus in order to specify the fault section.

Figure 21:
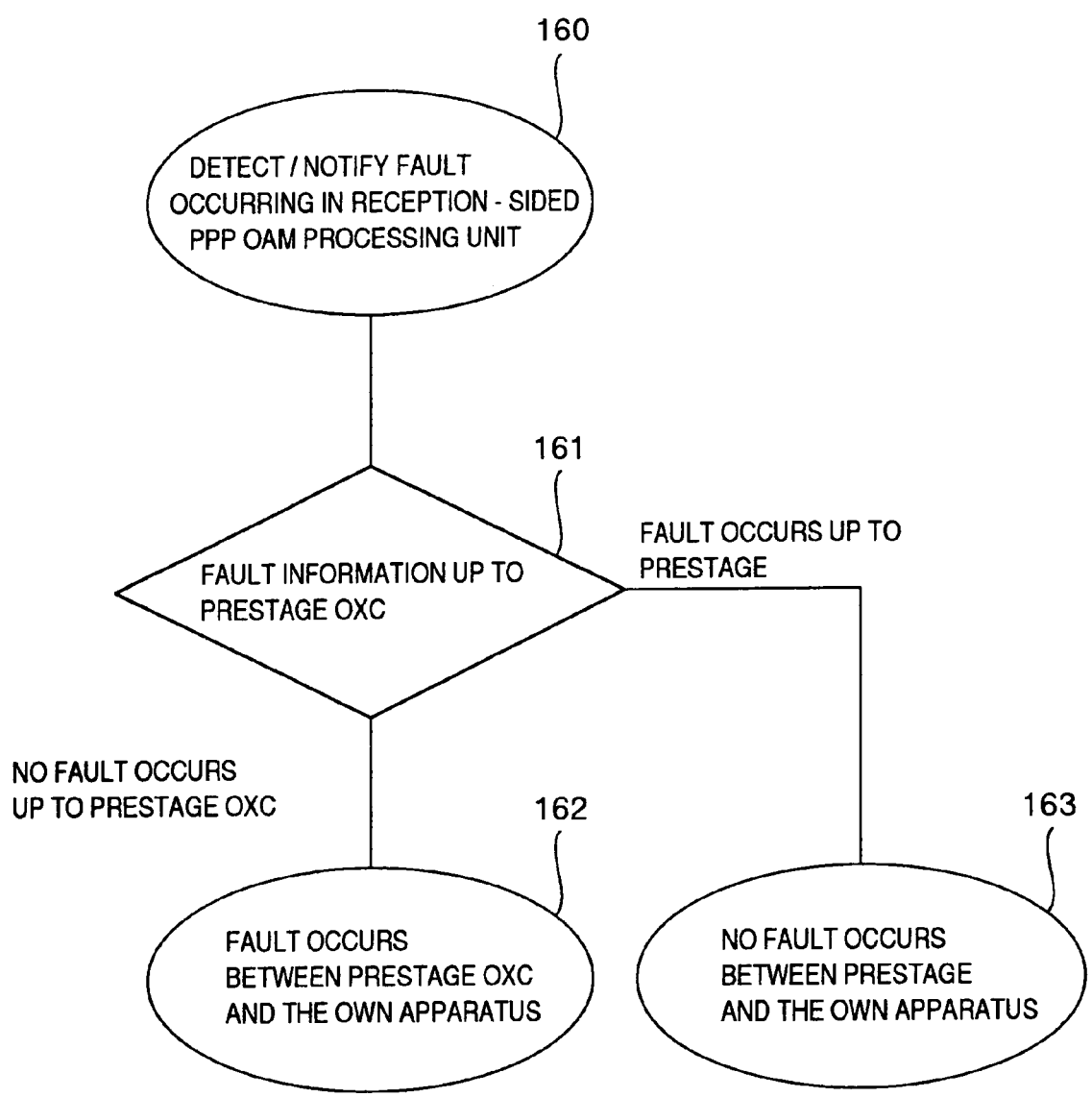
FIG. 21 is a flow chart for describing a detection flow operation by a fault detecting system according to the present invention.

FIG. 21 is a flow chart for describing a judging method for a fault section. When the MPU 82 receives the notification of the fault detection by the reception-sided PPP OAM processing unit, this MPU 81 compares this fault detection notification with the fault information defined from the SV channel up to the prestage OXC. If there is a fault up to the prestage OXC, then the MPU 82 judges that this is not the fault of the section between the prestage OXC and the own apparatus. If the operation condition up to the prestage OXC is normal, then the MPU 82 judges that the fault occurs in the section. When the MPU 82 judges that the fault section can be specified, and the fault occurs in the working path of this section, the MPU 82 switches the optical selector 81 from the working path to the protection path so as to perform the fault restoration.

The fault occurring in a portion of the optical channel can be detected by way of the above-explained method, and furthermore, the optical channel can be switched.

In accordance with the present invention, it is possible to detect the performance degradation of the optical channel which constitutes the packet communication network. Moreover, it is possible to switch the optical channel by detecting the performance degradation.

What is claimed is:

1. An Internet Protocol (IP) packet communication apparatus connected optical network comprising:
    an input interface to be connected to the optical network for receiving an IP packet;
    an output interface to be connected to the optical network for transmitting an IP packet;
    switch means for transferring the IP packet received by the input interface to the output interface in accordance with a header value of the IP packet; wherein,
    the IP packet communication apparatus detects a transmission performance of the optical network by monitoring the IP packet received by the input interface, and produces, based on the result of the monitoring, an IP controlling packet used to notify the transmission performance to other IP packet communication apparatus, and then sends the IP controlling packet from the output interface to the optical network.

2. The IP packet communication apparatus according to claim 1, wherein:
    the output interface monitors IP packets to be outputted to the optical network irrespective of address information of the IP packets.

3. The IP packet communication apparatus according to claim 1, wherein:
    the output interface monitors IP packets to be outputted to the optical network by classifying address information of the IP packets.

4. The IP packet communication apparatus according to claim 1, wherein:
    the output interface produces the IP controlling packet in a fixed period.

5. The IP packet communication apparatus according to claim 1, wherein:
    the optical network has both a transmission path of working path and a transmission path of a protection path; and
    the input interface monitors inputted IP packets, and when the input interface detects communication performance degradation or a communication fault in the transmission path of the working path based on a result of the monitoring, the interface initiates switching the transmission path from the working path to the protection path.

6. An IP packet communication apparatus connected optical network comprising:
an input interface to be connected to the optical network for receiving an IP packet; and
an output interface to be connected to the optical network for transmitting an IP packet; wherein,
the IP packet communication apparatus receives an IP controlling packet that is generated on an other IP packet communication apparatus that notifies a transmission performance of the optical network from said other IP packet communication apparatus via the optical network, and analyzes a content of the received IP controlling packet.

7. The IP packet communication apparatus according to claim 6, wherein:
the IP controlling packet carries a value which indicates the number of IP packets transmitted, from the other IP packet communication apparatus, to the optical network connected to the input interface, and
the input interface counts the number of received IP packets and then compares the number of the received IP packets with the number of IP packets indicated by the value carried by the IP controlling packet.

8. The IP packet communication apparatus according to claim 6, wherein:
the IP controlling packet carries a value which indicates a BIP (bit interleave parity) of IP packets transmitted, from the other IP packet communication apparatus, to the optical network connected to the input interface, and
the input interface counts the BIP of received IP packets and then compares the BIP of said received IP packets with the BIP carried by the IP controlling packet.

9. An IP packet communication apparatus connected optical network comprising:
an input interface to be connected to the optical network for receiving an IP packet;
an output interface to be connected to the optical network for transmitting an IP packet; and
switch means for transferring the IP packet received by the input interface to the output interface in accordance with a header value of the IP packet; wherein,
the IP packet communication apparatus detects a failure of the optical network by monitoring the IP packet received by the input interface, and produces, based on the result of the monitoring, an IP controlling packet used to notify the failure of the optical network to other IP packet communication apparatus, and then sends the IP controlling packet from the output interface to the optical network.

10. The IP packet communication apparatus according to claim 9, wherein:
the output interface monitors IP packets to be outputted to the optical network irrespective of address information of the IP packets.

11. The IP packet communication apparatus according to claim 9, wherein:
the output interface monitors IP packets to be outputted to the optical network by classifying address information of the IP packets.

12. The IP packet communication apparatus according to claim 9, wherein:
the output interface produces the IP controlling packet in a fixed period.

13. The IP packet communication apparatus according to claim 9, wherein:
the optical network has both a transmission path of working path and a transmission path of a protection path; and
the input interface monitors inputted IP packets, and when the input interface detects communication performance degradation or a communication fault in the transmission path of the working path based on a result of the monitoring, the interface initiates switching the transmission path from the working path to the protection path.

14. An IP packet communication apparatus connected optical network comprising:
an input interface to be connected to the optical network for receiving an IP packet; and
an output interface to be connected to the optical network for transmitting an IP packet; wherein,
the IP packet communication apparatus receives an IP controlling packet that is generated on an other IP packet communication apparatus and that notifies a failure of the optical network from said other IP packet communication apparatus via the optical network, and analyzes a content of the received IP controlling packet.

15. The IP packet communication apparatus according to claim 14, wherein:
the IP controlling packet carries a value which indicates the number of IP packets transmitted, from the other IP packet communication apparatus, to the optical network connected to the input interface, and
the input interface counts the number of received IP packets and then compares the number of the received IP packets with the number of IP packets indicated by the value carried by the IP controlling packet.

16. The IP packet communication apparatus according to claim 14, wherein:
the IP controlling packet carries a value which indicates a BIP (bit interleave parity) of IP packets transmitted, from the other IP packet communication apparatus, to the optical network connected to the input interface, and
the input interface counts the BIP of received IP packets and then compares the BIP of said received IP packets with the BIP carried by the IP controlling packet.

17. The IP packet communication apparatus according to claim 5, wherein:
the input interface counts the IP packets having the error, for detecting a fault occurred in the transmission path of the working path based on the counted number of the IP packet having the error.

18. The IP packet communication apparatus according to claim 13, wherein:
the input interface counts the IP packets having the error, for detecting a fault occurred in the transmission path of the working path based on the counted number of the IP packet having the error.

* * * * *